(12) United States Patent
Hattori et al.

(10) Patent No.: US 7,141,796 B2
(45) Date of Patent: Nov. 28, 2006

(54) VEHICLE INFORMATION PROVIDING APPARATUS

(75) Inventors: Hiroshi Hattori, Utsunomiya (JP);
Nobuharu Nagaoka, Shioya-gun (JP);
Masahito Watanabe, Utsunomiya (JP);
Takayuki Tsuji, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 756 days.

(21) Appl. No.: 10/273,314

(22) Filed: Oct. 17, 2002

(65) Prior Publication Data
US 2003/0083790 A1    May 1, 2003

(30) Foreign Application Priority Data
Oct. 29, 2001    (JP)    ............... 2001-331287

(51) Int. Cl.
*G06F 17/00*    (2006.01)
(52) U.S. Cl. ............................... 250/370.08
(58) Field of Classification Search ........... 250/370.08; 348/39
See application file for complete search history.

(56) References Cited

U.S. PATENT DOCUMENTS

| | | | |
|---|---|---|---|
| 6,137,531 A | 10/2000 | Kanzaki et al. | |
| 6,327,536 B1 * | 12/2001 | Tsuji et al. | ............... 701/301 |
| 6,552,742 B1 * | 4/2003 | Seta | ............... 348/42 |
| 2003/0007074 A1 * | 1/2003 | Nagaoka et al. | ............ 348/148 |
| 2005/0100192 A1 * | 5/2005 | Fujimura et al. | ............ 382/103 |

FOREIGN PATENT DOCUMENTS

| | | |
|---|---|---|
| JP | 07-029014 | 1/1995 |
| JP | 11-328364 | 11/1999 |

* cited by examiner

*Primary Examiner*—Otilia Gabor
(74) *Attorney, Agent, or Firm*—Carrier, Blackman & Associates, P.C.; William D. Blackman; Joseph P. Carrier

(57) ABSTRACT

A vehicle information providing apparatus determines and displays the range of presence of a person or other object based on the characteristics of images recorded by infrared cameras. An image processing unit carries out brightness change search processing in the infrared camera image zone represented by a gray scale using a search area wherein the size of a first detected area detected by binarization and correlation operation serves as the reference. In addition, the parallax between the first detected area and the searched area having a change in brightness is compared, a search area having a parallax that differs from that of the first searched area is eliminated, and a search area having a parallax identical to that of the first searched area is provided a highlighted display as an object identical to that of the first detected area.

9 Claims, 20 Drawing Sheets

PHYSICAL OBJECTS IN FRAMES P1 TO P4 ARE OBJECTS

L1: (x3, y3, 2)
L2: (x4, y4, 2)
L3: (x3, y5, 3)
L4: (x7, y3, 8)
L5: (x8, y4, 7)
L6: (x9, y5, 8)
L7: (x9, y6, 8)
L8: (x8, y7, 8)

OBJECT 1   OBJECT 2

L1: (x3, y3, 2, 1)
L2: (x4, y4, 2, 1)
L3: (x3, y5, 3, 1)
L4: (x7, y3, 8, 2)
L5: (x8, y4, 7, 2)
L6: (x9, y5, 8, 2)
L7: (x9, y6, 8, 2)
L8: (x8, y7, 8, 2)

OBJECT LABELS

TIME K

TIME (K+1)

RIGHT IMAGE

LEFT IMAGE

FIG. 10A RIGHT IMAGE
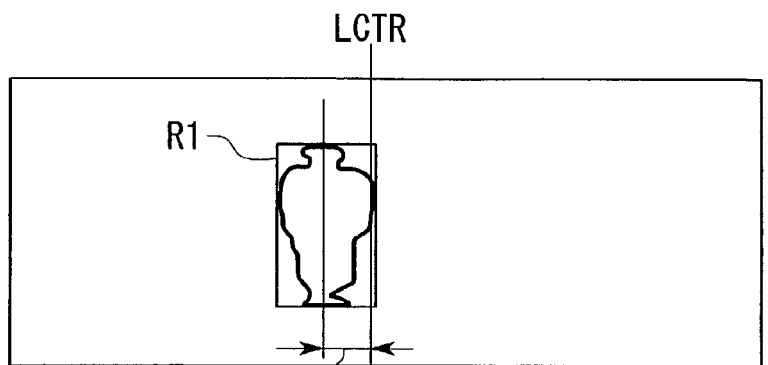
FIG. 10B LEFT IMAGE
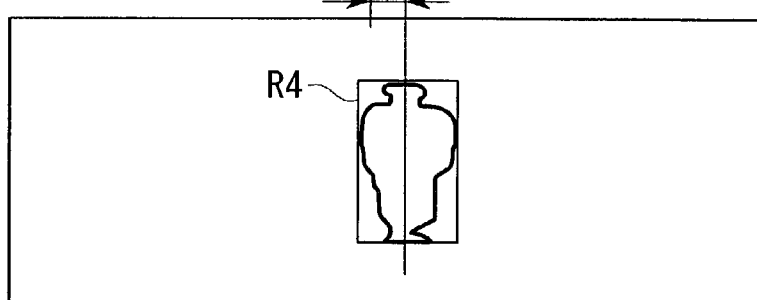
FIG. 11A TIME K
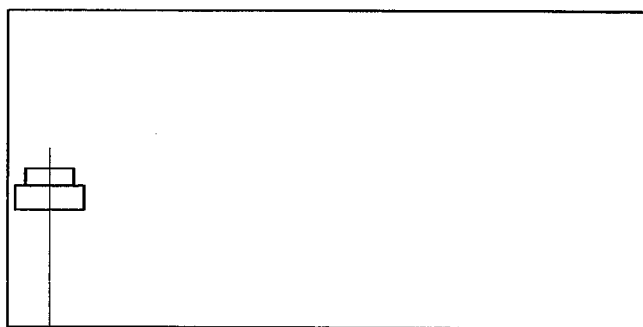
FIG. 11B TIME (K+1)
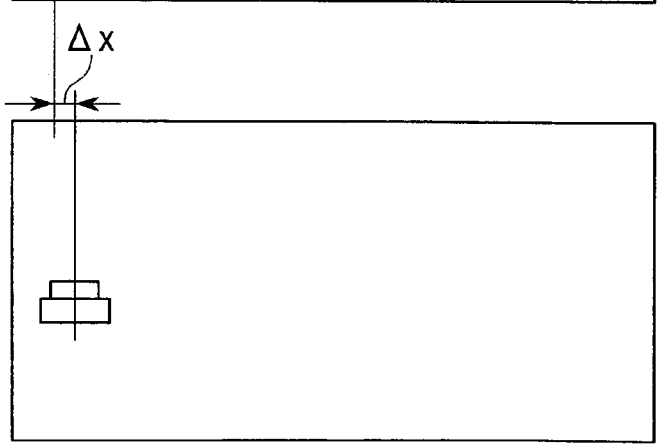

DETERMINING OBJECT IS THE ENTIRE BODY BY DISTANCE AND SIZE

A LARGE PART OF THE BODY IS RECORDED

VEHICLE INFORMATION PROVIDING APPARATUS

BACKGROUND OF THE INVENTION

1. Field of the Invention

The present invention relates to a vehicle information providing apparatus that detects and displays, for example, a physical object present in the vicinity of a vehicle.

2. Background of the Invention

Conventionally, in order to notify the driver of a vehicle about an obstacle such as a pedestrian on the travel path, an apparatus is known in which an image from one or a plurality of infrared cameras mounted on the front of the vehicle is displayed at a position visible from the driver's seat to complement the front visual field of the driver. The image displayed to the driver is displayed on an image display apparatus such as a NAVIDisplay disposed in the dashboard of the vehicle, a HUD (Head Up Display) that displays information at a position on the front window that does not obscure the front visual field of the driver, a meter integrated display that is integrated with a meter that displays the travel state of the automobile numerically, or the like.

In addition, for example, Japanese Unexamined Patent Application, First Publication, Hei 11-328364 discloses an apparatus that records the environment in the vicinity of the vehicle and displays the result to the driver in this manner. In this apparatus, the temperature of the exposed skin of the head of the detected object is higher than the temperature of the other parts, and first the position of the head of the detected object is identified using the fact that it is comparatively easy to record as an image of an infrared camera. The zone corresponding to the body of the detected object is determined based on the information of the identified position of the head. Thereby, for example, caution can be prompted by displaying to the driver not only the head of the pedestrian, but also the entire body.

However, in the conventional apparatus described above, in the case that the detected object is recorded from the front, the amount of infrared radiation of the skin of the face is large in comparison to other parts, and thus the position of the head of the detected object is easy to detect. However, although detecting the zone of the entire body therefrom is easy, in such a case as the detected object being recorded from the back, the parts other than the face are extracted, and it is difficult to identify the position of the head.

In addition, the temperature of parts of the body of the detected object change depending on the conditions and the environment. Examples are parts whose temperature rises due to direct exposure to the sun and parts whose temperature is lowered due to being blown on by the wind. Consequently, due to the increase or decrease in temperature, it is not always the case that the position of the head can be identified from the recorded image. The zone that corresponds to the body identified from the part recognized as the position of the head may be different from the zone in which the detected object is actually present.

In consideration of the problems described above, it is an object of the present invention to provide a vehicle information providing apparatus that determines and displays the range of presence of a person from the characteristics of images recorded by an infrared camera.

SUMMARY OF THE INVENTION

In order to solve the problems described above, a first aspect of the vehicle information providing apparatus of the present invention, which displays an image recorded by an infrared camera, comprises an extracted zone setting device (for example, step S 1 to step S 18 in the embodiments) that sets a present zone of the physical object detected by multivalued processing of the image as the extracted zone (for example, the first extracted zone 51), a search area setting device (for example, step S 21 to step S 24 in the embodiments) that sets the search area (for example, search areas 54 to 58 in the embodiments) in the vicinity of the extracted zone, and a physical object recognition device (for example, step S 25 to step S 37 in the embodiments) that searches for changes in brightness in the searched area, and provides a highlighted display of the area where there is a change in brightness along with the extracted zone as the same object.

The vehicle information providing apparatus having the structure described above sets the search area by setting as the reference the extracted zone set by the extracted zone setting device and searching the zone exhibiting a change in brightness in the vicinity of the extracted zone. Thereby, the zone in which a physical object identical to the object recorded in the extracted zone can be provided in a highlighted display along with the extracted zone.

A second aspect of the vehicle information providing apparatus of the present invention comprises two infrared cameras and a parallax calculating device (for example, step S 34 in the embodiments) that finds the parallax of the images recorded by the two cameras, and the physical object recognizing device gives a highlighted display of the zone having a change in brightness and parallax identical to the extracted zone as an identical physical body.

The vehicle information providing apparatus having the structure described above recognizes a zone having a change in brightness and parallax identical to the extracted area as the area in which a physical body identical to the physical body that was taken in the extracted area, and this can be given a highlighted display along with the extracted area.

In a third aspect of the vehicle information providing apparatus of the present invention, the physical object recognizing device stops searching for changes in brightness in the case that the adjacent search area (for example, search areas 52 and 53 in the embodiments) set above or below the extracted zone exceeds the range of the image.

In a vehicle information providing apparatus of the present invention having the structure, the physical object recognizing device gives a highlighted display of only an extracted zone without a search of the physical object by determining that the large part of the physical object in the extracted zone is recorded in the case that the zone of the image is exceeded when the search area setting device sets the search area above or below the extracted zone.

BRIEF DESCRIPTION OF THE DRAWINGS

FIGS. 10A and 10B are drawings showing the method of calculating the parallax between objects in the distance calculation of the object.

FIGS. 11A and 11B are drawings showing the offset of the position of the object in the image generated by the turning of the car.

DESCRIPTION OF THE PREFERRED EMBODIMENTS

Below, the embodiments of the present invention will be explained with reference to the drawings.

Figure 1:
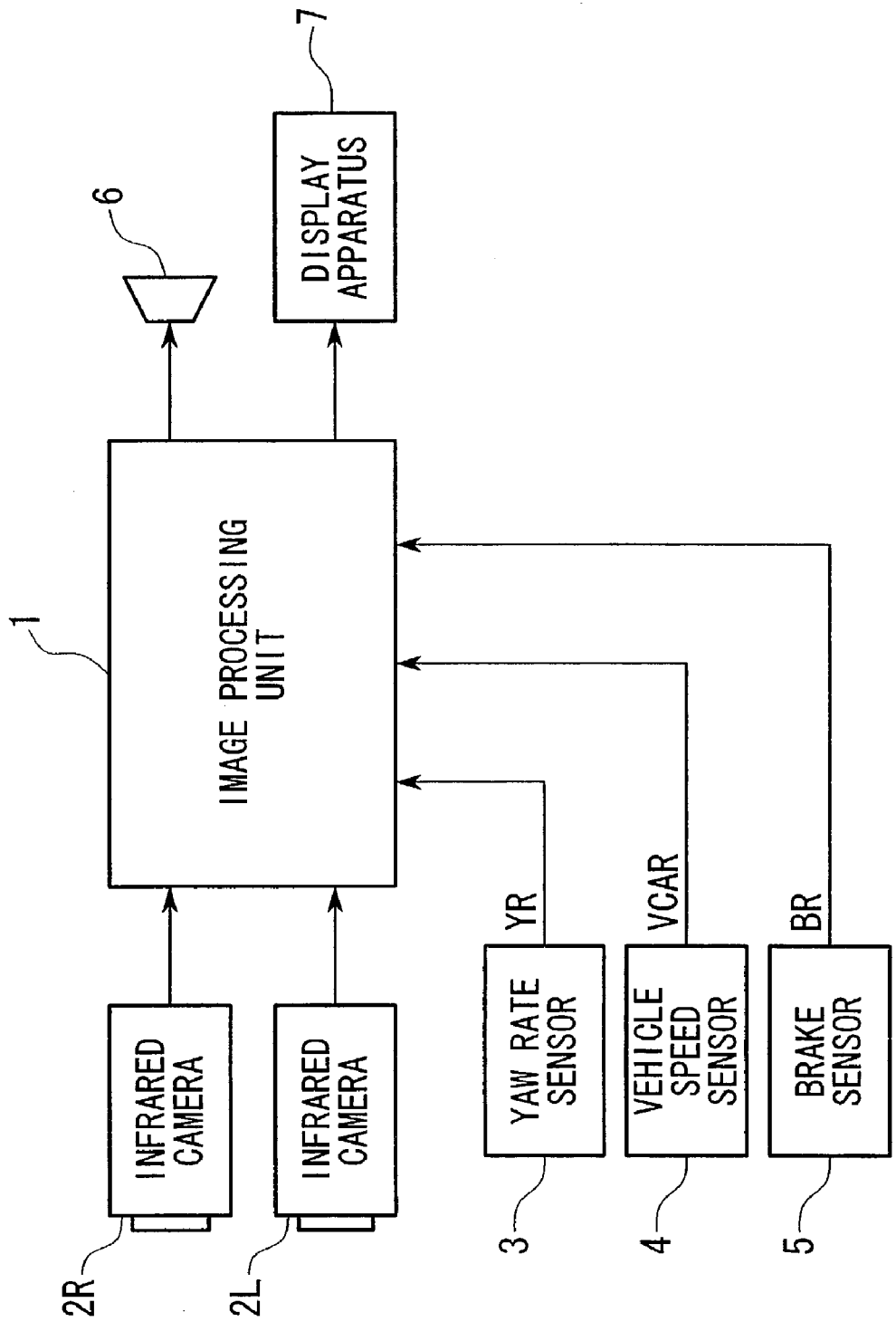
FIG. 1 is a block diagram showing the structure of the vehicle information providing apparatus according to an embodiment of the present invention.

FIG. 1 is a block diagram showing the structure of the vehicle information providing apparatus according to an embodiment of the present invention.

In FIG. 1, reference numeral 1 is an image processing unit providing a CPU (central control unit) that controls the vehicle information providing apparatus according to the present embodiment, and wherein two infrared cameras 2R and 2L that can detect infrared radiation, a yaw rate sensor 3 that detects the yaw rate of the vehicle, a vehicle speed sensor 4 that detects the travel speed (vehicle speed) of the vehicle, and brake sensors 5 that detect the operation of the brakes are connected together. Thereby, the image processing unit 1 detects a moving physical object such as a pedestrian or animal in front of the vehicle from an infrared image of the vicinity of the vehicle and a signal indicating the travel state of the vehicle, and issues a warning when it determines that the possibility of a collision is high.

In addition, in the image processing unit 1, a speaker 6 for issuing a warning by voice, and an image display apparatus 7 including, for example, a meter integrated Display having a meter integrated for showing numerically the travel condition of the vehicle, a NAVIDisplay mounted in the dashboard of the vehicle, or a HUD (head up display) 7a that displays information at a position on the front window at a position that does not obscure the front visual field of the driver, are connected. The image display apparatus 7 is for displaying the image recorded by the infrared cameras 2R and 2L, and informing the driver about objects with which there is a high danger of collision.

In addition, the image processing unit 1 comprises an A/D conversion circuit for converting input analog signals into digital signals, image memory for storing the digitalized image signal, a CPU (central processing unit) that carries out each of the operation processes, RAM (random access memory) that the CPU uses to store data that is being processed, ROM (read only memory) for storing programs executed by the CPU, tables, maps, or the like, a drive signal for the speaker 6, and an output circuit that outputs display signals or the like from the HUD 7a or the like. Each of the output signals of the infrared cameras 2R and 2L, the yaw rate sensor 3, the vehicle speed sensor 4, and the brake sensors 5 are formed so as to be converted to digital signals and then input into the CPU.

Figure 2:
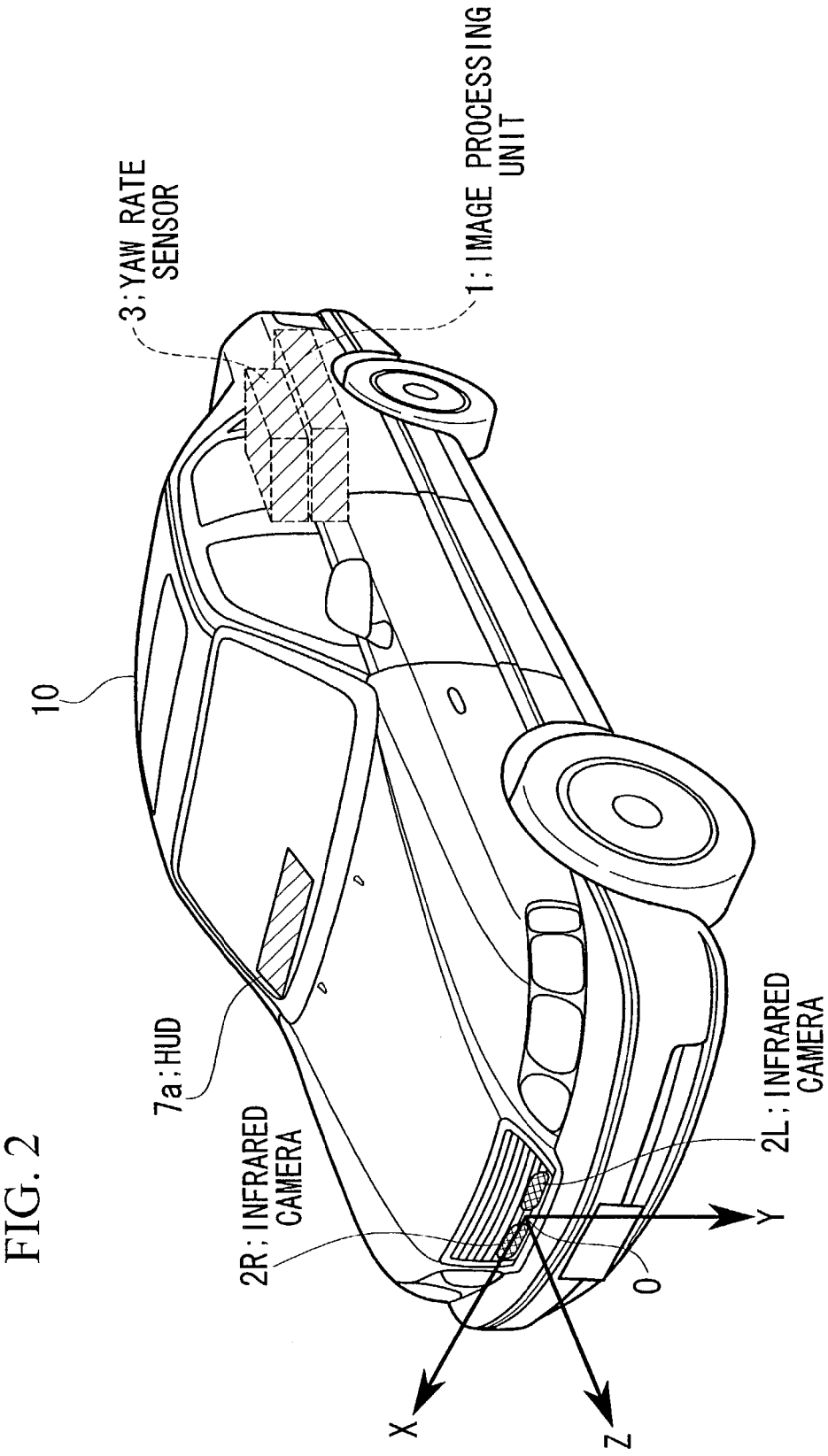
FIG. 2 is a drawing showing the installation positions of the infrared cameras, sensors, display, and the like on the vehicle.

In addition, as shown in FIG. 2, on the front of the vehicle 10, the infrared cameras 2R and 2L are mounted at a positions substantially symmetrical with respect to the center in the transverse direction of the vehicle 10, the optical axis of the two infrared cameras 2R and 2L are mutually parallel, and their heights above the surface of the road are fixed so as to be equal. Moreover, the infrared cameras 2R and 2L have the characteristic that the output signal level becomes higher (the brightness increases) the higher the temperature of the object.

In addition, the HUD 7a is mounted so that the display image is displayed at a position on the window of the vehicle 10 that does not obscure the visual field of the driver.

Next, the operation of the present embodiment will be explained with reference to the figures.

Figure 3:
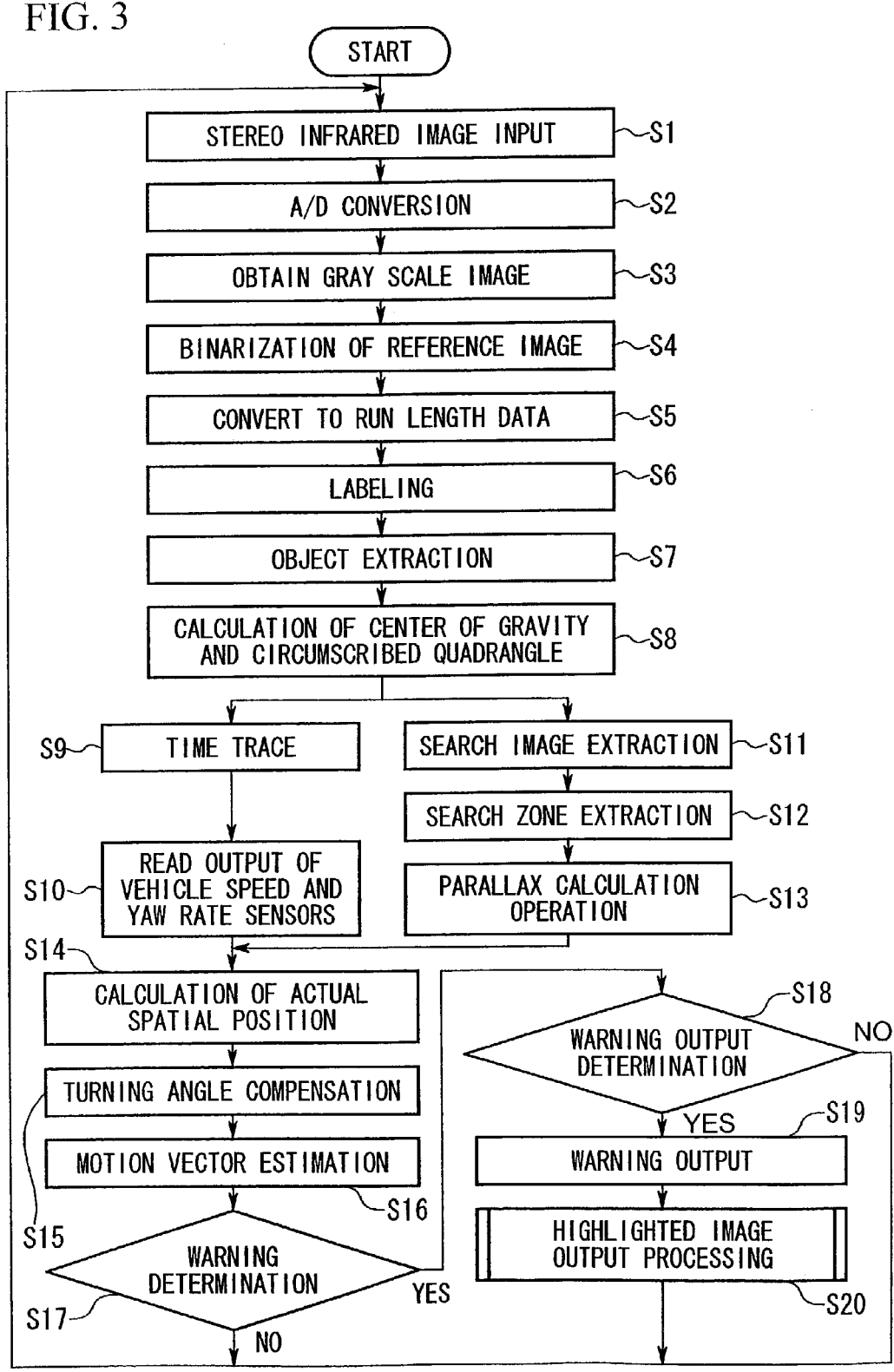
FIG. 3 is a flowchart showing the entire operation of the vehicle information providing apparatus according to the same embodiment.

FIG. 3 is a flowchart showing the processing sequence in the image processing unit 1 of the vehicle information providing apparatus according to the same embodiment.

First, the image processing unit 1 records the infrared image, which is the output signal of the infrared cameras 2R and 2L (step S 1), carries out A/D conversion thereon (step S 2), and stores the gray scale image in the image memory (step S 3). Moreover, here the right image is obtained by the infrared camera 2R and the left image is obtained by the infrared camera 2L. In addition, because the horizontal position of an identical object on the display screen is displayed out of alignment in the right image and the left image, the distance to the object can be calculated using this misalignment (parallax).

Next, the right image obtained from the infrared camera 2R is made the reference image, and binary processing of this image signal is carried out. In this binary processing, a 1 (white) is assigned to a zone brighter than a brightness threshold value ITH, and a 0 (black) is assigned to a dark zone.

Figure 4A:
FIGS. 4A and 4B show the gray scale image taken by the infrared camera and the binary image thereof.
Figure 4B:
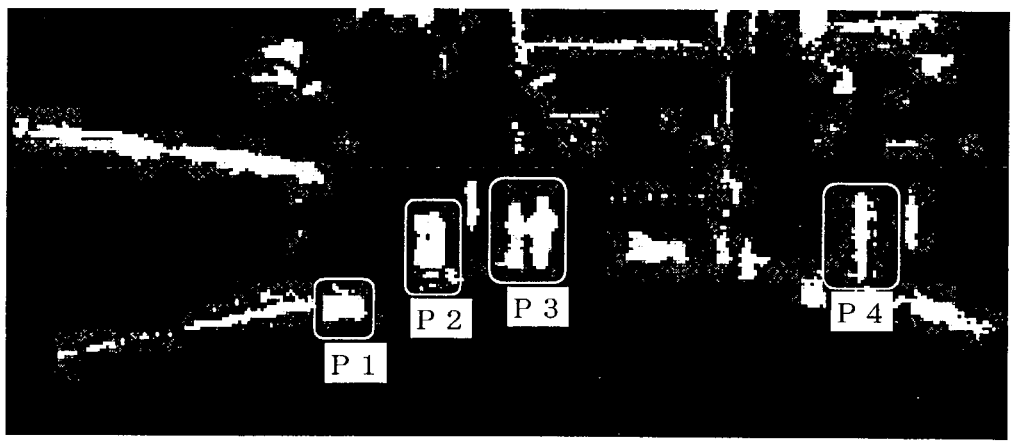

FIG. 4A shows a gray scale image obtained by the infrared camera 2r, and by carrying out binary processing thereon, the image shown in FIG. 4B is obtained. Moreover, in FIG. 4B, the physical object surrounded by the frame from P1 to P4, for example, will be an object (below, referred to as a "high brightness zone") displayed as white on the display screen.

When the binary image data from the infrared cameras is obtained, processing is carried out in which the binary image data is converted to run length data (step S 5).

Figure 5A:
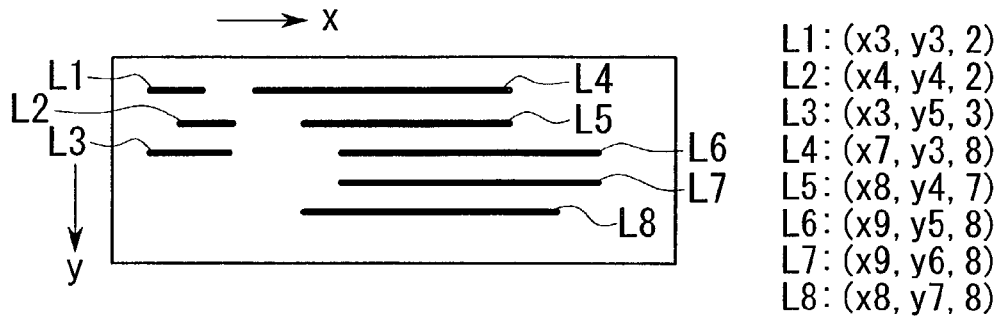
FIGS. 5A, 5B, and 5C are drawings showing the conversion processing to a run length data and labeling.

FIG. 5A is a drawing to explain this, and in this figure the zone that has become white due to binary conversion is shown as the lines L1 to L8. Lines L1 to L8 all have a width of 1 pixel in the y direction, and while they are actually arranged without a space between them in the y direction, they have been separated for the sake of the explanation. In addition, the lines L1 to L8 respectively have the lengths 2 pixels, 2 pixels, 3 pixels, 8 pixels, 7 pixels, 8 pixels, 8 pixels, and 8 pixels. The run length data is shown by the coordinates of the start point of each of the lines (the point on the left end of each line) and the length (number of pixels) from the start point to the end point (the point on the right end of each line). For example, line L3 comprises the 3 pixels (x3, y5), (x4, y5), and (x5, y5), and thus (x3, y5,3) becomes the run length data.

Figure 5B:
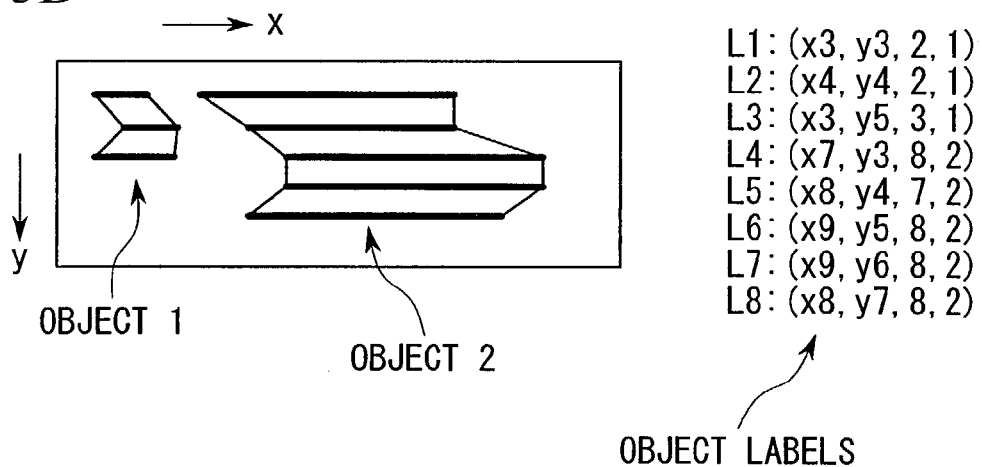

Next, from the image data converted into run length data, by labeling the object (step S 6), the processing in which the object is extracted is carried out (step S7). That is, as shown in FIG. 5B, among the lines L1 to L8 that have been converted to run length data, the lines L1 to L3, which are the parts overlapping in the y direction, are treated as one object 1, lines L4 to L8 are treated as one object 2, and the object labels 1 and 2 are added to the run length data. By this processing, for example, the high brightness zones shown in FIG. 4B are respectively recognized as objects 1 through 4.

Figure 5C:
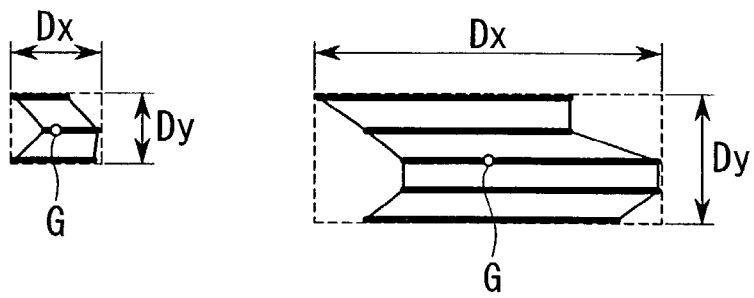

When the extraction of the objects has completed, as shown in FIG. 5C, next the center of gravity G, surface zone S, and the aspect ratio ASPECT of the circumscribed quadrangle represented by the broken lines is calculated (step S 8).

Here, the surface zone S is calculated by adding the lengths of the run length data for the same object. In addition, the coordinate of the center of gravity G is calculated as the x coordinate of the line that bisects the surface zone S in the x direction, and the y coordinate of the line that bisects it in the y direction. Furthermore, the aspect ratio ASPECT is calculated as the Dy/Dx ratio of Dy and Dx shown in FIG. 5C. Moreover, the position of the center of gravity G can be substituted for by the position of the center of gravity of the circumscribed quadrangle.

Figure 6A:
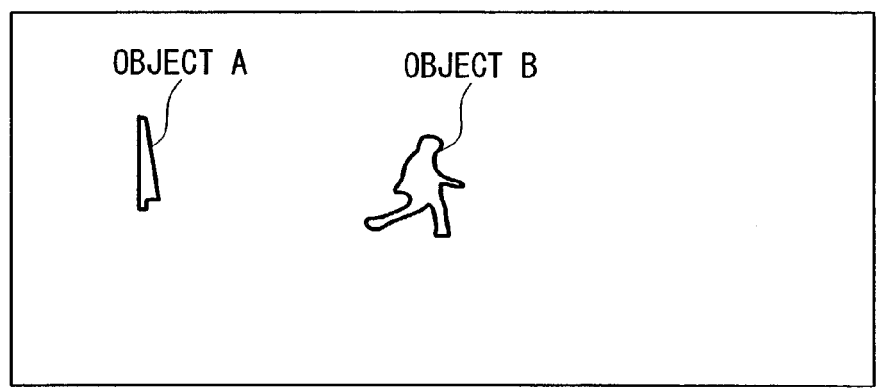
FIGS. 6A and 6B are drawings showing the time tracking of the object.

When the center of gravity, the surface zone, and the aspect ratio of the circumscribed quadrangle have been calculated, next recognition of the time trace, that is, the sampling of each cycle, of the same object is carried out (step S 9). In a time trace, k serves as the time during which time t, an analogue amount, is made discrete at a sampling cycle, and as shown in FIG. 6A, in the case that objects A and B are extracted at time k, obj cots C and D extracted at time (k+1) are determined to be identical to obj cots A and B. Specifically, when the following identity determination conditions 1 to 3 are satisfied, objects A and B are determined to be identical to objects C and D, and objects C and D have their labels changed respectively to objects A and B.

1) When the position coordinates of the center of gravity in the image of the object i (=A, B) at time k are set respectively to (xi (k), yi (k)) and the position coordinates of the center of gravity in the image of the object j (=C, D) at time (k+1) are set respectively to (xj (k+1), yj (k+1)), then |xj (k+1)−xi (k)|<Δx|yj (k+1)−yi (k)|<Δy, where Δx and Δy denote the allowable values of the amount of movement in the picture respectively in the x direction and the y direction.

2) When the surface zone of the object i (=A, B) in the image at time k is Si (k) and the surface zone of the object j (=C, D) in the image at time (k+1) is Sj (k+1), then Sj (k+1)/Si (k)<1±ΔS, where ΔS denotes the allowable values of the change in zone.

3) When the aspect ratio of the circumscribed quadrangle of the object i (=A, B) at time k is ASPECT i (k) and the aspect ratio of the circumscribed quadrangle of the object j (=C, D) is ASPECT j (k+1), then ASPECT j (k+1)/ASPECT i (k)<1±Δ ASPECT, where Δ ASPECT denotes the allowable values of the aspect ratio.

Figure 6B:
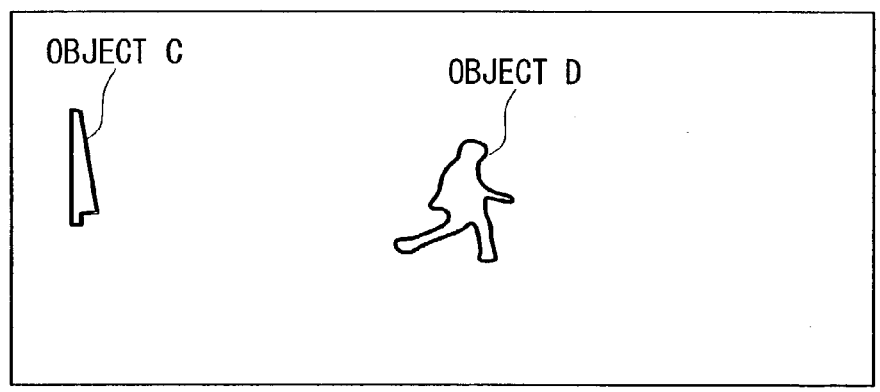

For example, when comparing FIG. 6A and FIG. 6B, although the size of each of the objects in the image becomes larger, the object A and the object C satisfy the conditions for the identification of identity described above and the object B and the object D satisfy the conditions for the identification of identity described above, and thus the objects C and D are respectively recognized to be the objects A and B. In this manner, the positions coordinates (of the center of gravity) of each of the recognized objects is stored in the memory as time series position data to be used on later calculation processing.

Moreover, the processing in steps S 4 to S 9 explained above is carried out on a binary reference image (in this embodiment, the right image).

Figure 7:
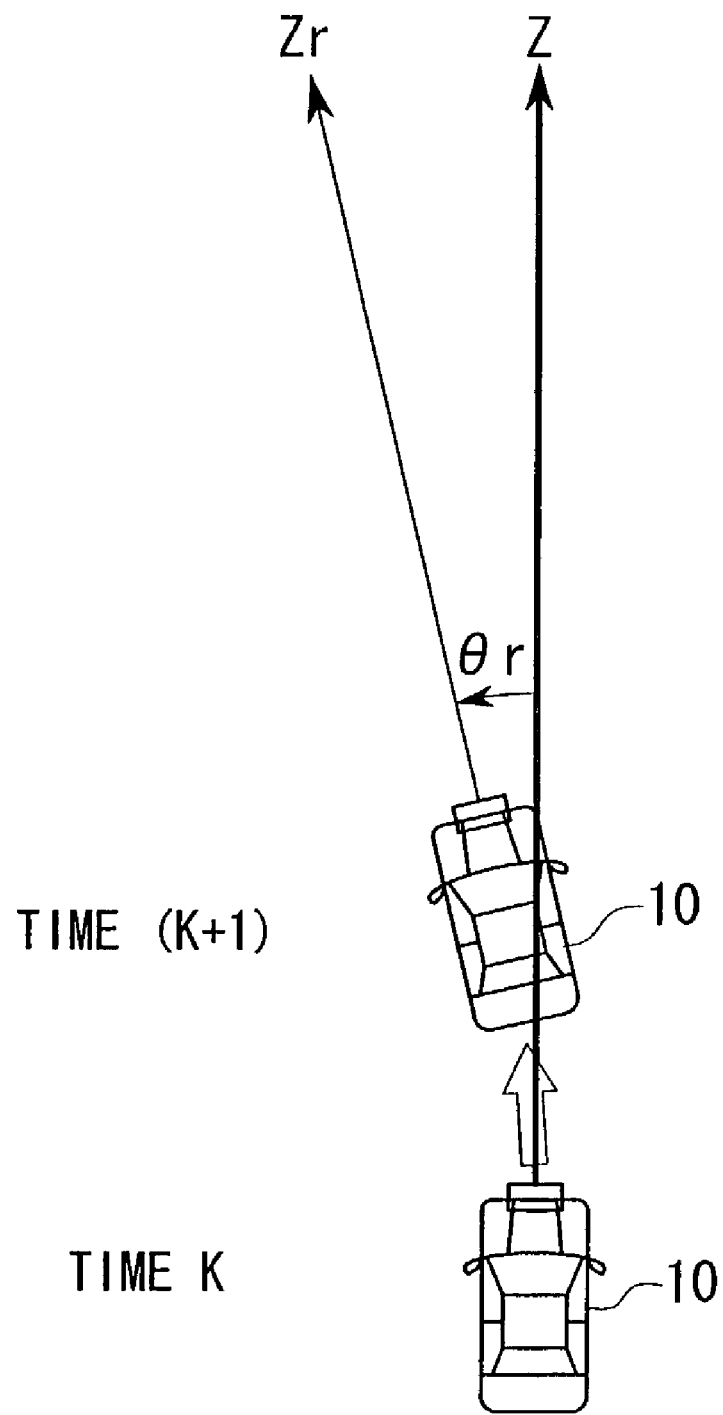
FIG. 7 is a drawing showing the rotation angle correction of the object image.

Next, the velocity VCAR detected by the velocity sensor 4 and the yaw rate YR detected by the yaw rate sensor 3 are read, and as shown in FIG. 7, the turning angle θr of the vehicle 10 is calculated by integrating the yaw rate YR with respect to time (step S 10).

In contrast, the processing of step S 9 and step S 10 is carried out in parallel, and in steps S 11 through S 13, processing that calculates the distance z between the object and the vehicle 10 is carried out. Because this calculation requires a longer time than step S 9 and step S 10, they are executed at a longer cycle than step S 9 and S 10 (for example, at a cycle about three times the execution cycle of steps S 1 to S 10).

Figure 8A:
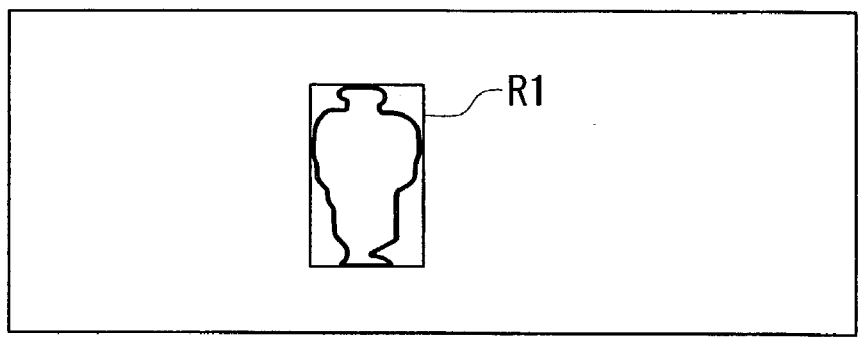
FIGS. 8A and 8B are drawings showing the search area in the right image and the search area set in the left image.

First, by selecting one among the objects that is traced out by the binary image of the reference object (the right image), as shown in FIG. 8A, in the search image R1 (here, the entire zone surrounded by the circumscribed quadrangle is made the searched image) is extracted from the right image (step S 11).

Figure 8B:
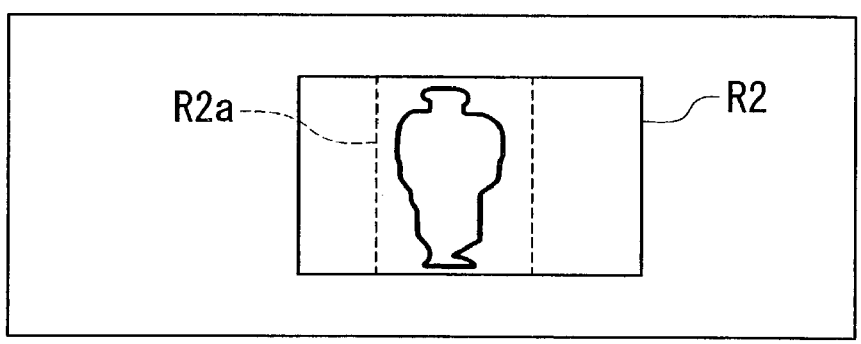

Next, the vehicle search area in which the image corresponding to the searched image (below, referred to as the "corresponding image") from the left image is set, and the corresponding image is extracted by executing the correlation calculation (step S 12). Specifically, as shown in FIG. 8B, depending on each of the peak coordinates of the searched image R1, the search region R2 in the left image is set, and the brightness difference total value C (a, b), which indicates the degree of the correlation with the searched image R1 in the search region R2, is calculated by the Eq. 1 shown below, and the zone in which this total value C (a, b) becomes minimum is extracted as the corresponding image. Note that this correlation calculation is carried out using the gray scale image, not the binary image.

In addition, when there is past position data for the identical physical body, based on this position data, a zone R2a (shown by the broken line in FIG. 8B) that is narrower than the search region R2 is set to serve as the search area.

$$C(a, b) = \sum_{n=0}^{N-1}\sum_{m=0}^{M-1} |IL(a+m-M, b+n-N) - IR(m, n)| \qquad \text{Eq. 1}$$

Figure 9:
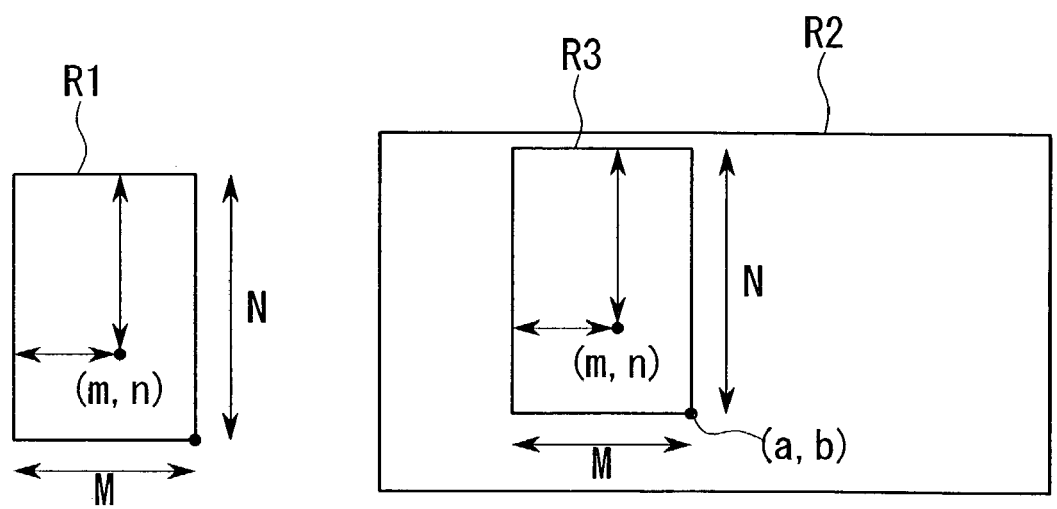
FIG. 9 is a drawing showing the correlative operation processing in which the search area is set as the object.

Here, IR(m, n) is the brightness value of the position of the coordinate (m, n) in the search area R1 shown in FIG. 9 and IL(a+m−M, b+n−N) is the brightness value of the position of the coordinate (m, n) in the search one R1 and the local zone R3 having the same shape, where the coordinates (a, b) in the search area are the base points. The position of the corresponding image is defined by finding the position at which the total value C (a, b) of the brightness difference is minimized by changing the coordinates (a, b) of the base point.

Due to the processing in step S 12, as shown in FIG. 10A and FIG. 10B, because the searched image R1 and the corresponding image R4 corresponding to this object are extracted, next the distance dR (number of pixels) between the position of the center of gravity of the searched image R1 and the image center line LCTR and the distance dL (number of pixels) between the position of the center of gravity of the corresponding image R4 and the image center line LCTR are found, and by applying the following Eq. 2, the distance z between the vehicle 10 and the object is calculated (step S 13).

$$z = \frac{B \times F}{(dL + dR) \times p} = \frac{B \times F}{\Delta d \times p} \qquad \text{Eq. 2}$$

Here, B is the base line length, that is, the distance in the horizontal direction between the center position of the photographic element of the infrared camera 2R and the center position of the photographic element of the infrared camera 2L (the separation of the light beam axis of both infrared cameras); F is the focal distance of the lenses of the infrared cameras 2R and 2L, p is the pixel separation in the photographic element of the infrared cameras 2R and 2L, and $\Delta d$ (=dR+dL) is the amount of parallax.

When the calculation of the turning angle $\theta r$ in step S 10 and the calculation of the distance to the object in step S 13 have completed, the coordinates (x, y) in the image and the distance z calculated by Eq. 2 are applied to the following Eq. 3, and converted to real spatial coordinates (X, Y, Z) (step S 14).

Here, as shown in FIG. 2, the real spatial coordinates (X, Y, Z) have as their origin O the position of the center point of the installation position of the infrared cameras 2R and 2L (the position at which they are fixed on the vehicle 10), they are fixed as shown in the figure, and the coordinates in the image are determined by x in the horizontal direction and y in the vertical direction, where the center of the image serves as the origin.

$$\begin{bmatrix} X \\ Y \\ Z \end{bmatrix} = \begin{bmatrix} xc \times z/f \\ yc \times z/f \\ z \end{bmatrix} \qquad \text{Eq. 3}$$

where f=F/p.

Here, (xc, yc) are the coordinates (x, y) of the right image that have been converted to coordinates of a virtual image in which the real spatial origin O and the center of the image have been made to coincide based on the relative positional relationship between the installation position of the infrared camera 2R and the real special origin O. In addition, f is the ratio of the focus distance F and the pixel interval p.

In addition, when the real spatial coordinates have been found, turning angle compensation is carried out in order to compensate the positional shift in the image due to the turning of the vehicle 10 (step S 15).

As shown in FIG. 7, when the vehicle turns, for example, at a turning angle $\theta r$ in the left direction during the time interval from time k to (k+1), a shift in the x direction by an amount equivalent to $\Delta x$, as shown in FIG. 11, occurs in the image obtained by the camera, and the turning angle compensation is a process to compensate this. Specifically, in the following Eq. 4, the real spatial coordinate system (X, Y, Z) is applied, and the compensated coordinates (Xr, Yr, Zr) are calculated. The calculated real spatial position data (Xr, Yr, Zr) is associated with each object and stored in memory. Moreover, in the following explanation, the coordinates after turning angle compensation are denoted (X, Y, Z).

$$\begin{bmatrix} Xr \\ Yr \\ Zr \end{bmatrix} = \begin{bmatrix} \cos\theta r & 0 & -\sin\theta r \\ 0 & 1 & 0 \\ \sin\theta r & 0 & \cos\theta r \end{bmatrix} \begin{bmatrix} X \\ Y \\ Z \end{bmatrix} \qquad \text{Eq. 4}$$

When the turning angle compensation for the real coordinates has completed, next, the approximately straight line LMV corresponding to the relative motion vector between the object and the vehicle 10 is found from N real spatial position data (for example, N=10) after turning angle compensation obtained during the monitoring period $\Delta T$ for one and the same object, that is from the time series data, (step S 16).

Concretely, when the direction vector L, which denotes the direction of the approximately straight line LMV, is equal to (lx, ly, lz) where (|L|=1), the straight line represented by the following Eq. 5 is found.

$$X = u \cdot lx + Xav$$

$$Y = u \cdot ly + Yav$$

$$Z = u \cdot lz + Zav$$

$$Xav = \sum_{j=0}^{N-1} X(j)/N \qquad \text{Eq. 5}$$

$$Yav = \sum_{j=0}^{N-1} Y(j)/N$$

$$Zav = \sum_{j=0}^{N-1} Z(j)/N$$

Here, u is a parameter that takes an arbitrary value, and Xav, Yav, and Zav are respectively the average values of the X coordinate, Y coordinate, and Z coordinate of the real spatial position data sequence.

Moreover, when the parameter u is eliminated, Eq. 5 becomes to Eq. 5a:

$$(X-Xav)/lx = (Y-Yav)/ly = (Z-Zav)/lz \qquad \text{Eq. 5a}$$

In addition, in the case, for example, that P(0), P(1), P(2), . . . , P(n−2), P(N−1) denote the time series data after turning angle compensation, the approximately straight line LMV passes through the average position coordinate Pav=(Zav, Yav, Zav) of the time sequence data, and is found as the straight line which is characterized in that the average value of the square of the distance from each of the data points is minimal.

Here, the numerical value in the parenthesis added to P, which denotes the coordinates of each of the data point, indicates that the larger the value, the older the data. For example, P(0) denotes the most recent position coordinate, P(1) denotes the position coordinate of one sample cycle back, and P(2) denotes the position coordinate two sample cycles back.

Next, when the most recent position coordinate P(0)=(X(0), Y(0), Z(0)), the position coordinate P(N−1)=(X(N−1), Y(N−1), Z(N−1)) of the (N−1) sample back (before time ΔT) is compensated to a position on the approximately straight line LMV. Concretely, by applying the Z coordinates Z(0), Z(N−1) to the Eq. 5a above, that is, the following Eq. 6, the position coordinates after compensation Pv(0)=(Xv(0), Yv(0), Zv(0)) and Pv(N−1)=(Xv(N−1), Yv(N−1), Zv(N−1)) are found.

$$Xv(j) = (Z(j) - Zav) \times \frac{lx}{lz} - Xav$$

$$Yv(j) = (Z(j) - Zav) \times \frac{ly}{lz} - Yav$$

Eq. 6

$$Zv(j) = Z(j)$$

$$j = 0, N-1$$

The relative motion vector is found as the vector from the position coordinate Pv(N−1) calculated in Eq. 8 towards Pv(0).

By finding the relative motion vector by calculating the approximately straight line that approximates the relative motion locus of the object with respect to the vehicle 10 from a plurality (N) of data within the monitoring period ΔT in this manner, the influence of position detection error can be reduced, and the possibility of a collision with the object can be more correctly predicted.

In addition, in step S 16, when the relative motion vector has been found, next the possibility of a collision with the detected object is determined, and a warning determination process, which issues a warning when the possibility is high, is executed (step S 17).

Figure 12:
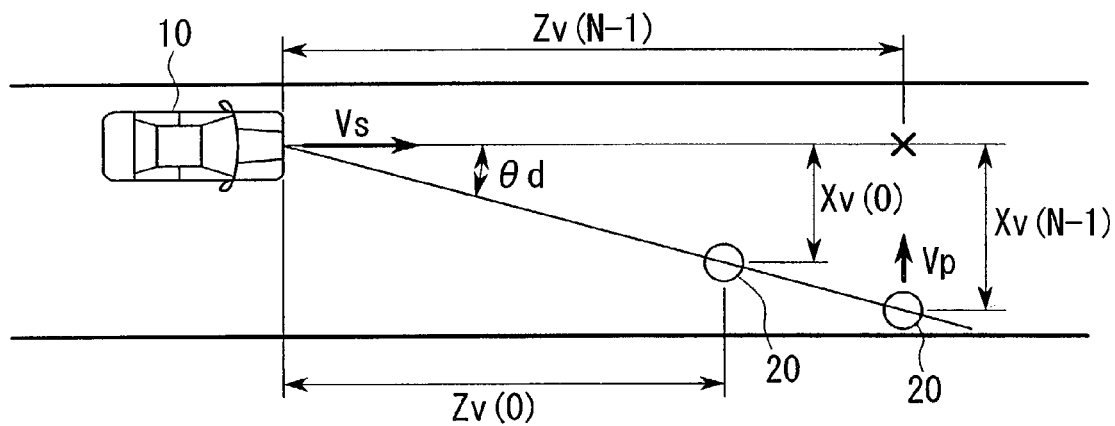
FIG. 12 is a drawing showing the case in which a collision may easily occur.

The warning determining processing (step S 17) is processing that determines the possibility of a collision between the vehicle 10 and the detected object by using any one of the collision detecting processing, processing to determine whether or not the object is in an approach determination zone, or invasive collision determination processing, which are described below. Below, as shown in FIG. 12, the explanation will treat an example wherein there is an animal 20 being approached at a speed Vp from a substantially 90° with respect to the direction of forward motion of the vehicle 10.

Collision Determining Processing

First, the image processing unit 1 calculates the relative velocity Vs in the Z direction using the following Eq. 7 from the animal 20 approaching the distance Zv(0) from the distance Zv(N−1) during the time ΔT, and carries out collision determination processing. The collision determination processing is processing that determines whether there is a possibility of a collision when the following Equations 8 and 9 are satisfied.

$$Vs = (Zv(N-a) - Zv(0))/\Delta T \qquad \text{Eq. 7}$$

$$Zv(0)/Vs \leq T \qquad \text{Eq. 8}$$

$$|Yv(0)| \leq H \qquad \text{Eq. 9}$$

Here, Zv(0) is the most recent distance detection value (v is attached in order to indicate that this is data after compensation using the approximately straight line LMV, while the Z coordinate is a value identical to that before compensation), and Zv(N−1) is the detected distance value before the time ΔT. In addition, T is an allowable time and signifies that the possibility of a collision is determined time T before the predicted collision time, and is about 2 to 5 seconds, for example. In addition, H is a predetermined height that defines the range of the Y direction, that is the height direction, and is set, for example, to about twice the height of the vehicle 10.

Figure 13:
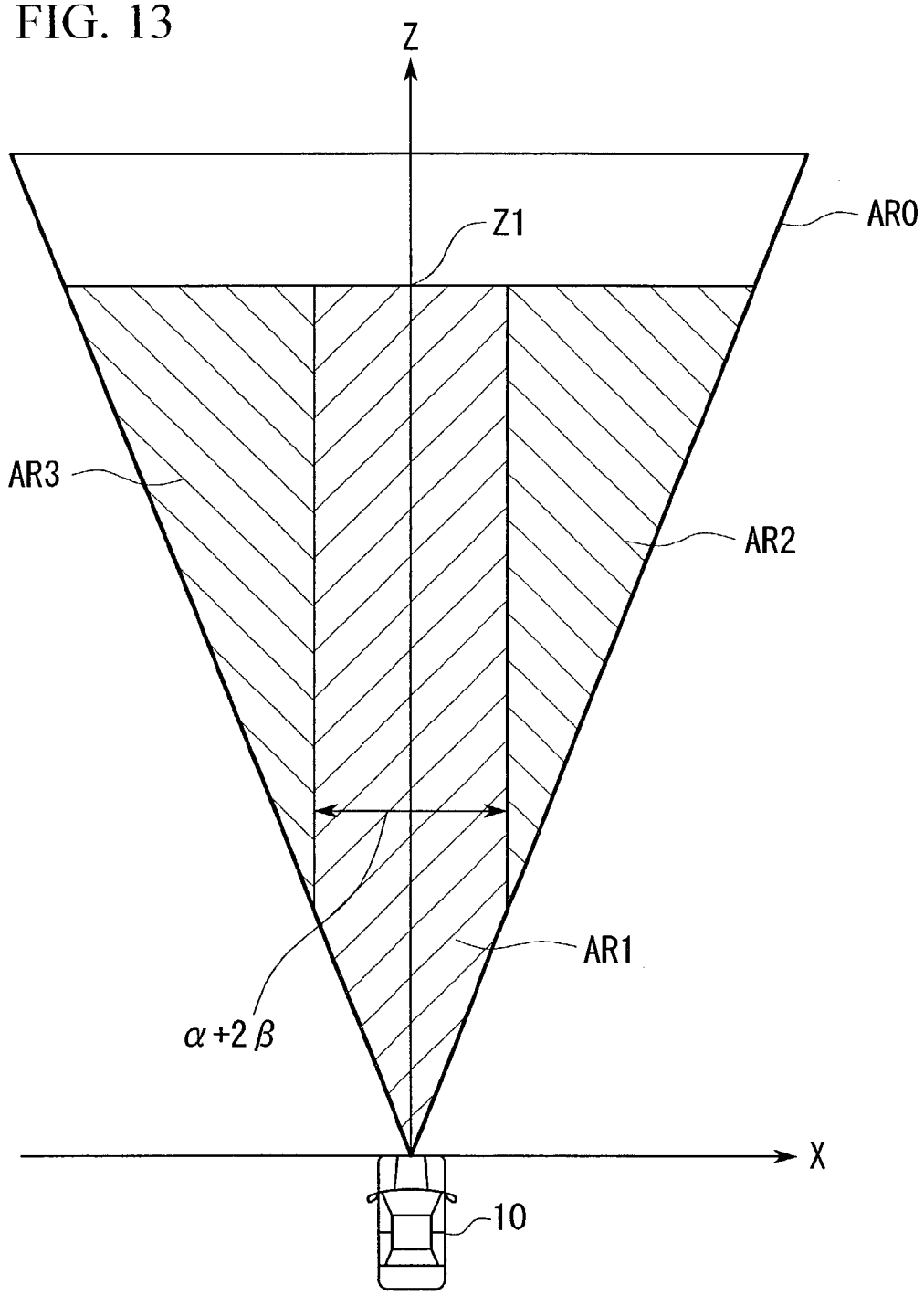
FIG. 13 is a drawing showing the zone division in front of the vehicle.

Processing for determining whether the object is in an approach determination zone Here, it is determined whether or not an object is present in the approach determination zone. For example, in FIG. 13, the zone that can be monitored by the infrared cameras 2R and 2L is indicated by the zone AR0 in the circumscribed triangle indicated by the bold solid line, and zones AR1, AR2, and AR3 in the zone AR0, which are closer to the vehicle 10 than Z1=Vs×T serve as the warning zones.

Here, AR1 is the zone corresponding to the range having added the allowance β (for example, about 50 to 100 cm) to both sides of the width α of the vehicle 10, or in other words, the zone having a width (α/2+β) on both sides of the axle at the center part in the width direction of vehicle 10, and if the object continues to be present as-is, the possibility of a collision is extremely high. Thus, these zones are called approach determination zones. The zones AR2 and AR3 are zones (in the outside transverse direction of the approach determination zone) in which the absolute value of the X coordinate is larger than the approach determination zone, an invasive collision determination, described below, is made about the object inside this zone, and thus this is called the invasive determination zone. Moreover, these zones have a predetermined height H in the Y direction, as shown in the above Eq. 9.

Invasive Collision Determining Processing

Concretely, the invasive collision determination processing in step S 23 distinguishes whether or not the difference between xc(0), which is the most recent x coordinate on the image (the character c, as will be explained below, is attached in order to signify that it is a coordinate on which compensation has been carried out that makes the center position of the image align with the real spatial origin point O) and xc(N−1), which is the x coordinate before the time ΔT, satisfies the following Eq. 10, and in the case that it is satisfied, it is determined that the possibility of a collision is high.

$$\frac{-\alpha \cdot f}{2}\left(\frac{1}{Zv(0)} - \frac{1}{Zv(N-1)}\right) \leq \qquad \text{Eq. 10}$$

$$xc(0) - xc(N-1) \leq \frac{\alpha \cdot f}{2}\left(\frac{1}{Zv(0)} - \frac{1}{Zv(N-1)}\right)$$

Figure 14:
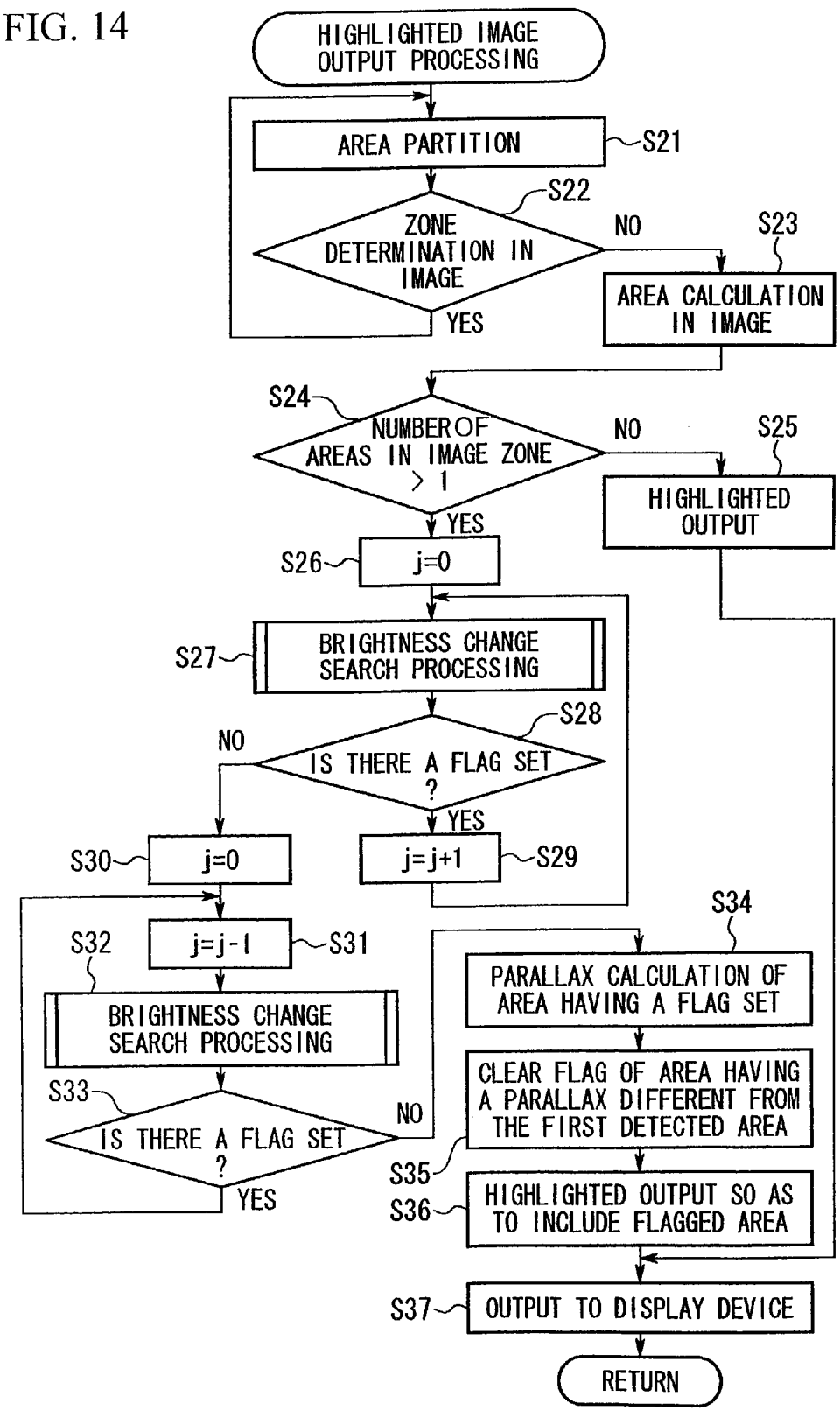
FIG. 14 is a flowchart showing the highlighted image output processing operation according to the first embodiment of the same example.

Moreover, as shown in FIG. 14, in the case that there is an animal progressing in a direction that is at an angle of approximately 90° with respect to the direction of the progress of the vehicle 10, when Xv(N−1)/Zv(N−1)=Xv(0)/Zr(0), or in other words, when the ratio of the velocity Vp and the relative velocity Vs of the animal is Vp/Vs=Xr(N−1)/Zr(N−1), the bearing θd viewing the animal 20 from the vehicle 10 becomes constant, and the possibility of a collision becomes high. Eq. 10 determines this possibility taking into account the width α of the vehicle 10.

In the warning determining processing (step S 17), in any of the collision determining processing, the processing for determining whether there is an object in the approach determining zone, or the invasive collision determining processing, in the case that it is determined that there is no possibility of collision between the vehicle 10 and the detected object (NO in step S 17), the processing returns to step S 1, and the processing described above repeats.

In addition, in the warning determining processing (step S 17), in the case that it is determined that there is a possibility of a collision between the vehicle 10 and the detected object by any of the collision determining processing, the processing to determined whether there is an object in the approach determining zone, or the invasive collision determining processing (YES in step S 17), the processing proceeds to the warning output determining processing of step S 18.

In step S 18, the warning output determining processing, that is, determining whether or not to carry out the warning output, is carried out (step S 18).

The warning output determination process determines whether or not the driver of the vehicle 10 is carrying out a braking action from the output BR of the brake sensor 5.

In the case that the driver of the vehicle 10 is carrying out a braking action, the acceleration Gs (positive in the deceleration direction) generated thereby is calculated, and when this acceleration Gs is larger than a predetermined threshold value GTH, it is determined that a collision can be avoided by the braking action, and the warning determination processing completes (NO in step S 18), the processing returns to step S 1, and the processing described above is repeated.

Thereby, when an appropriate braking action is carried out, no warning is issued, and the driver will not be excessively annoyed.

In addition, when the acceleration Gs is equal to or less than a predetermined threshold GTH, and additionally, if the driver of the vehicle 10 is not carrying out a braking action, the flow immediately proceeds to the processing in step S 19 (YES in step S 18). Because the possibility of contact with the object is high, a warning message is issued via speaker 3 (step S 19), and at the same time, a gray scale image obtained, for example, from the infrared camera 2R is displayed on the image display apparatus 7, and the highlighted display frame is set on the object being approached. Thereby, the object is displayed to the driver of the vehicle 10 as a highlighted image (step S 20).

Moreover, the predetermined threshold value GTH is determined by the following Eq. 11. This is the value corresponding to the condition in which the vehicle 10 stops at a running distance equal to or less than the distance Zv(0) in the case that the acceleration Gs during the braking action is maintained as-is.

$$GTH = \frac{Vs^2}{2 \times Zv(0)}$$ Eq. 8

Next, the highlighted display output processing in step S 20 shown in the flowchart in FIG. 3 will be explained with reference to the flowcharts shown in FIG. 14 and FIG. 18 and the drawings shown in FIG. 15 and FIG. 17.

First Embodiment

FIG. 14 is a flowchart showing the entire operation of the highlighted image output processing operation according to the first embodiment.

In FIG. 14, first the size of the area (below, referred to as the "first detected area") of the object detected by binarization and correlation operation is set as the reference, a plurality of areas are established by partitioning the zone of the first detected area in the vertical direction such that their size is identical to that of the first detected area, and this serves as the search area (step S 21).

In addition, in establishing the plurality of search areas by partitioning the zone of the first detected area vertically, it is determined whether or not the partitioned search area is in the zone of the reference image (fight image) (step S 22), the processing returns to step S 21 until the search area protrudes from the reference image, and then repeats the area partition of the zone (establishing the search area) (YES in step S 22).

In contrast, when the search area protrudes from the reference image (NO in step S 22), the number of areas partitioned in the reference image is calculated (step S 23).

In addition, it is determined whether or not the number of areas in the reference image zone is greater than one (step S 24).

In step S 24, in the case that the number of areas in the reference image zone is one (the case in which the number of areas is one in the first detected area in the reference image zone and the number of areas is 2 in the search area protruding vertically from the reference image zone, making a total of three) (NO in step S 24), the first detected area is set as the highlighted display area (step S 25).

Figure 15A:
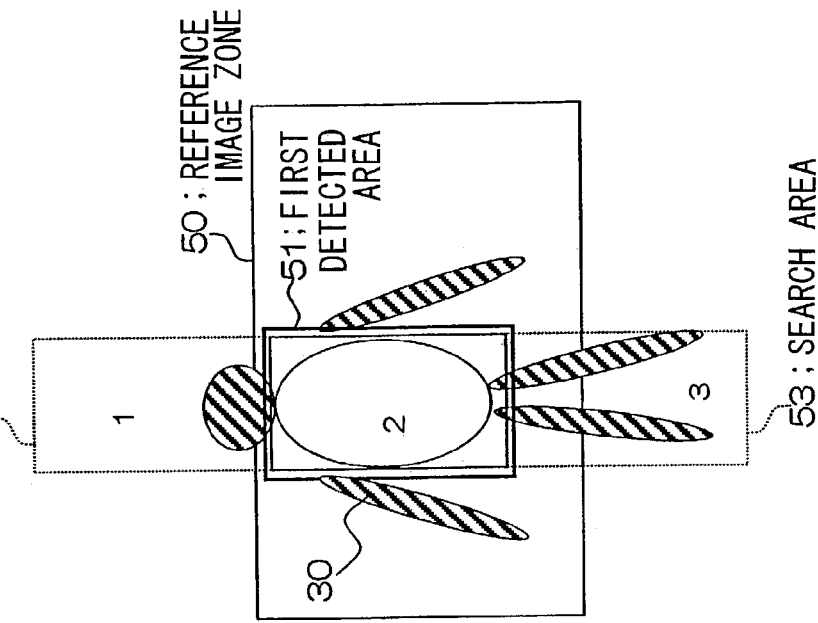
FIGS. 15A and 15B are drawings showing an example of a zone division result in the image of the same example.
Figure 15B:
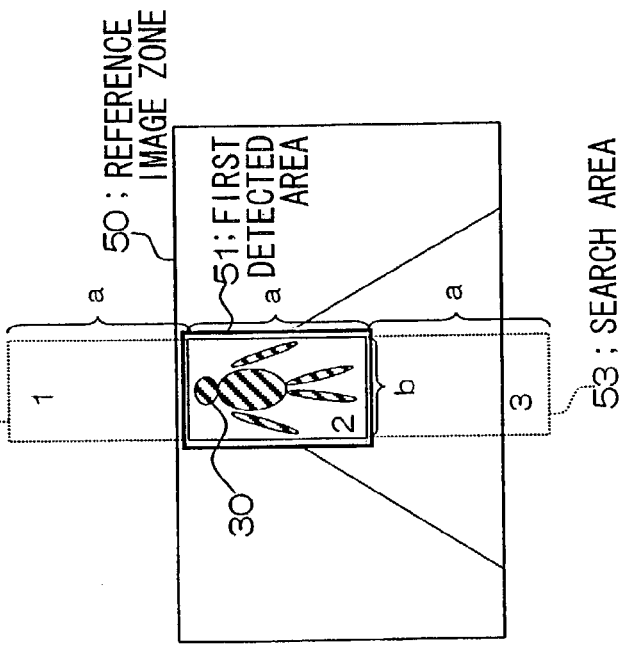

FIGS. 15A and 15B are drawings showing an example of an image in the case that the object 30 is a human and the number of areas in the reference image zone 50 is one. FIG. 15A is the case in which the entire body of the object 30 has been taken in the first detected area 51, and whether this is the entire body can be determined by the area size and distance of the object 30. In contrast, 15B is the case in which a part of the body of the object 30 has been taken in the first detected area 51. In either case, the first detected area 51 in the reference image zone 50 and the search areas 52 and 53 that vertically protrude from the reference image zone 50 are established, making a total of three areas.

Next, in step S 24, in the case that the number of areas in the reference image zone is more than one (YES in step S 24), the search area setting is carried out by making the row that includes the first detected area 51 the reference, and the register j for distinguishing rows is reset (j=0) (step S 26).

In addition, it is determined whether or not a change in the brightness of the image in the search area is recognized, the search area in the row designated by the register j is determined in the longitudinal direction for each search area, and the brightness change search processing that sets the flag in the search area in which a change in brightness in the image is recognized is carried out (step S 27). Moreover, the details of the brightness change search process will be described below.

Figure 16A:
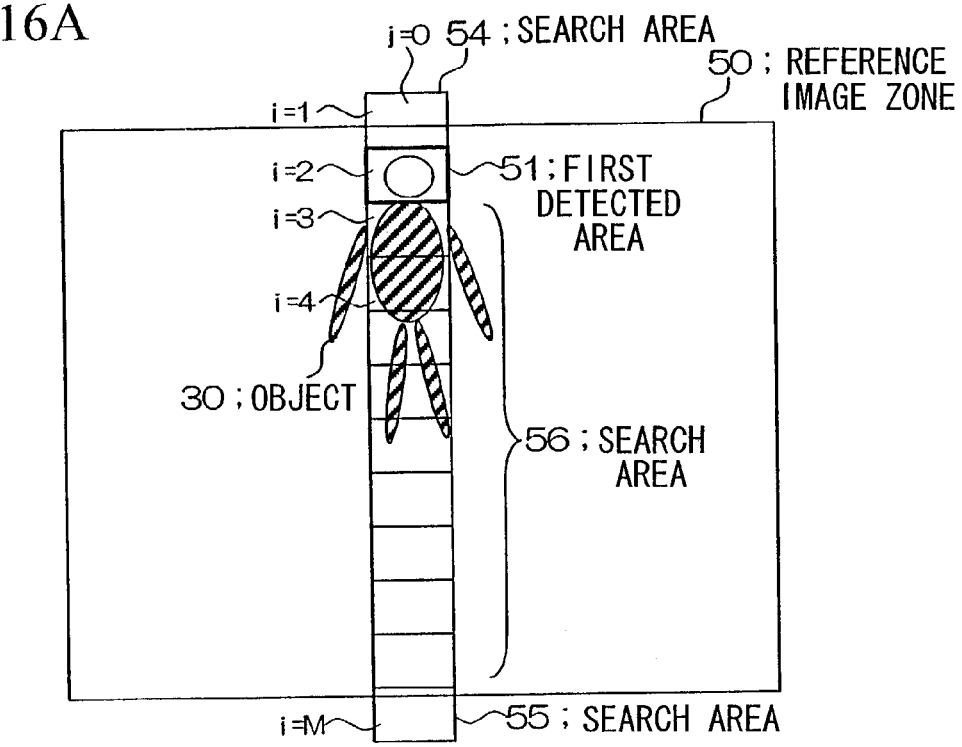
FIGS. 16A and 16B is a drawing showing the zone searched sequence in the image according to a first embodiment of the same example.

FIG. 16A shows an image row in the case that the object 30 is a person and the number of areas in the reference image zone 50 is greater than one. For example, in FIG. 16A, a row is formed comprising the first detected area 51, the search areas 54 and 55 that are present in the vertical direction thereto and protrude from the reference image zone 50, and further, a plurality of search areas 56 present in the reference image zone 50, for a total of M areas. In addition, because this row serves as the reference, this row is set to j=0.

Next, it is determined whether or not there is a flag indicating that a change in brightness was recognized in the image in the search area of the row designated by the register j (step S 28).

In step S 28, in the case that there is a flag indicating that a change in brightness was recognized in the image in the search area in the designated row (YES in step S 28), the adjacent row to be searched presently is designated by increasing j by 1 (j=j+1) (step S 29), the processing returns to step S 27, and the brightness change search processing is carried out on the new row (step S 27).

In addition, in step S 28, in the case that there is no flag indicating that a change in brightness has been recognized in the image in the search area in the designated row (NO in step S 28), j is reset (j=0) (step S 30), j is decreased by 1 (j=j−1), and thereby a row on the opposite side of the one searched above is designated (step S 31).

Additionally, like step S 27 described above, brightness change search processing is carried out (step S 32).

Next, like step S 28 described above, it is determined whether or not there is a flag indicating that a change in brightness has been recognized in the image in the search area in the row designated by the register j (step S 33).

In step S 33, in the case that there is a flag indicating that a change in brightness has been recognized in the image in the search area in the designated row (YES in step S 33), the processing returns to step S 31, j is decreased by 1 (j=j−1), and thereby the adjacent row to be search presently is designated, and in step S 32 brightness change search processing is carried out on the new row (step S 32).

Figure 16B:
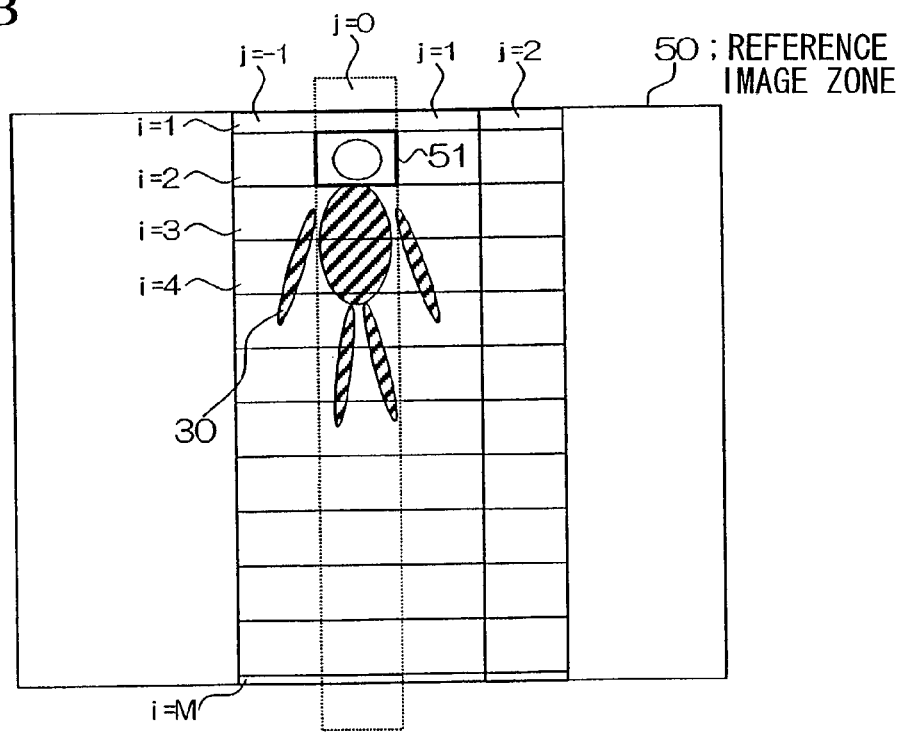

FIG. 16B is a drawing showing the case in which the search area searched up to j=2 where a recognized change in brightness is not present, and thus j=−1 on the opposite side of j=0 is searched.

In addition, in step S 33, in the case that there is no flag indicating that a change in brightness has been recognized in the image in the search area in the designated row (NO in step S 33), it is determined that the search in the reference image zone 50 has completed, and next the parallax calculation is carried out on the search area for which a flag has been set (step S 34).

Additionally, the flag of the search area having a parallax that differs from the first search area 51 (a differing distance from the vehicle 10) is cleared (step S 35).

In addition, when the search area having a differing parallax is eliminated, highlighted display is carried out such that the first search area 51 and the search area having a set flag are included (step S 36).

Moreover, the highlighted display output set in step S 25 and the highlighted display output set in step S 36 are output to the image display apparatus 7 (step S 37), and the highlighted display output processing is completed.

Figure 17A:
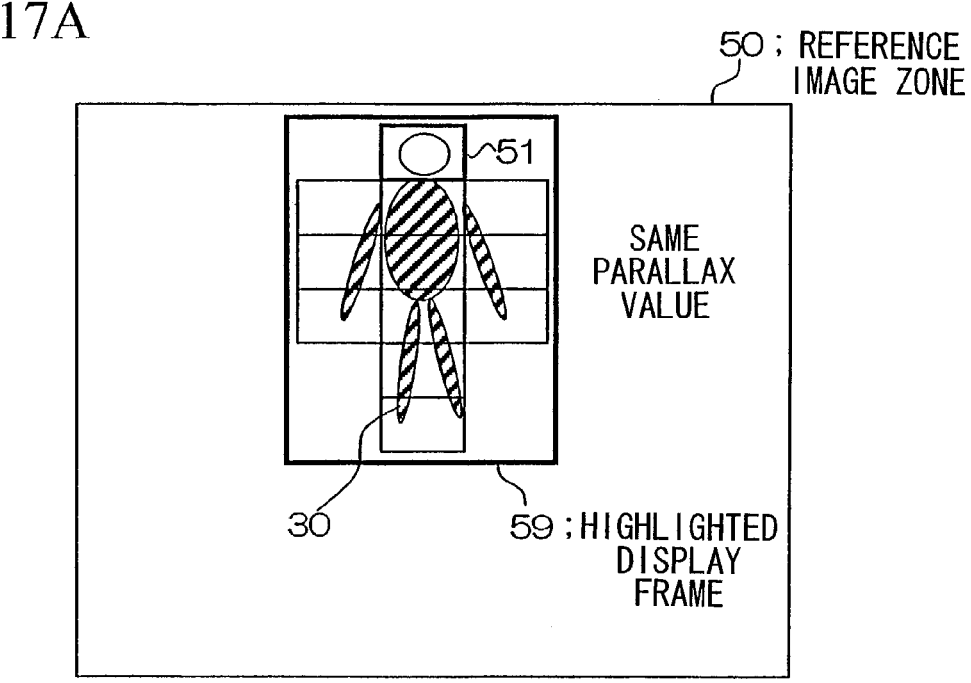
FIGS. 17A and 17B are drawings showing the zone searched sequence in the image according to a first embodiment of the same example.
Figure 17B:
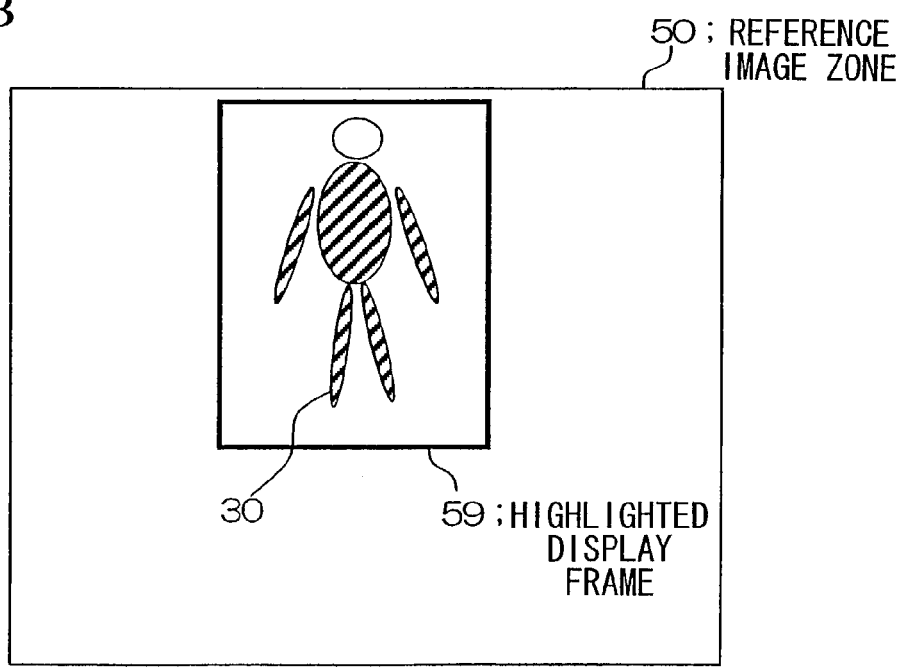
Figure 18:
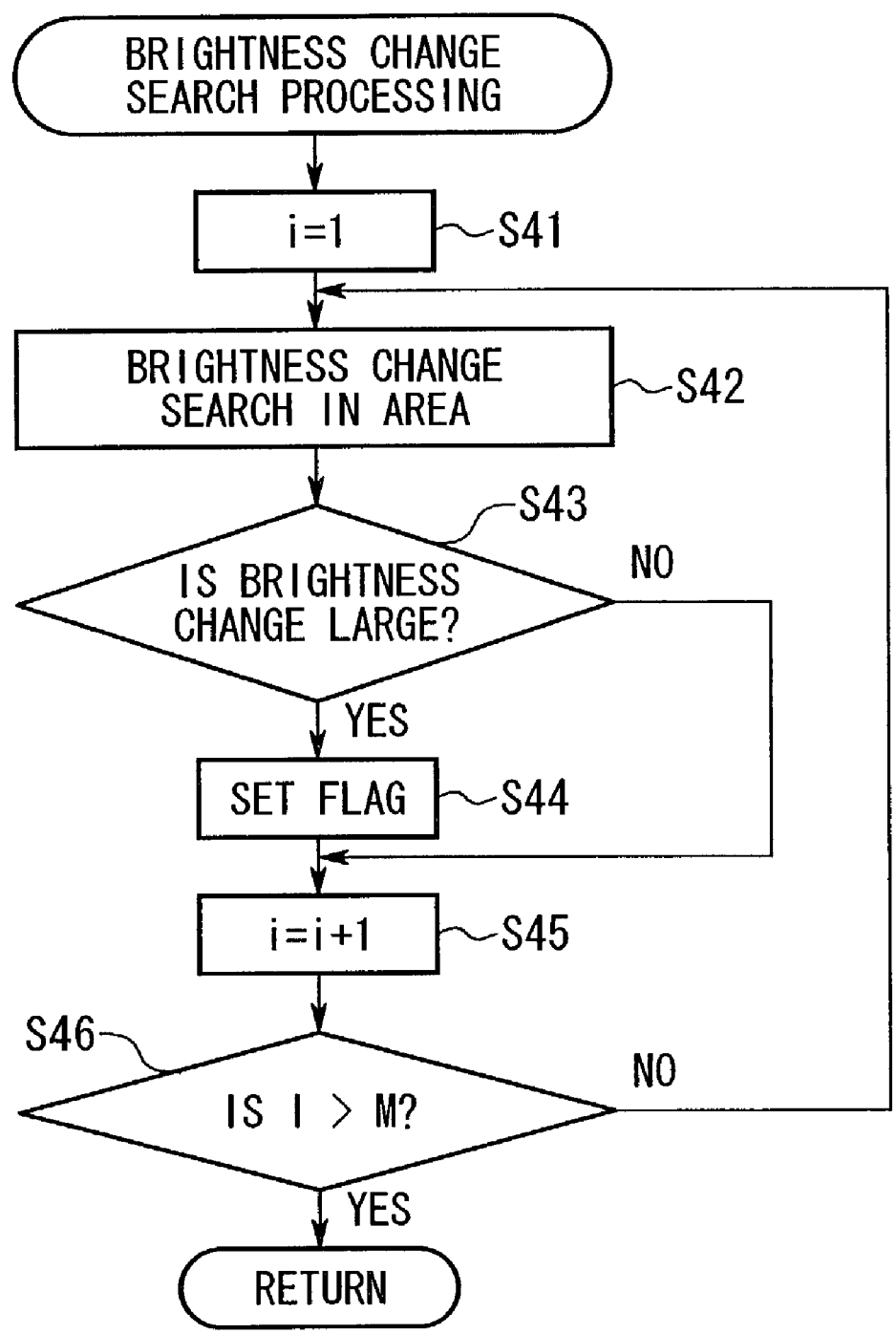
FIG. 18 is a flowchart showing the brightness change search processing operation of the vehicle information providing apparatus of the same example.

Based on FIG. 16A and FIG. 16B, FIG. 17A shows the state in which the highlighted display frame 59 that includes the first detected area 51 and the search area that includes a search area recognized to have a change in brightness is set. In addition, as shown in FIG. 17B, when output to the image display apparatus 7, the highlighted display frame 59 that includes the entire object, which is easily recognized as having an object shape, is set on the displayed gray scale image.

Next, the brightness change search processing will be explained using the flowchart shown in FIG. 18.

The brightness change search processing is processing in which it is determined whether or not a change in brightness in the image in the search area can be recognized in each search area in the row designated by the register j, and sets a flag in a search area where a change in brightness is recognized in the image. The search area in the row is searched in the direction of the row (longitudinal direction) with respect to the designated row.

First, in order to carry out a search in the direction of the column, the register i for distinguishing columns is set (i=1) (step S 41).

Next, for the search area in the row designated by the register i, a search is carried out to determine whether or not a change in brightness in the gray scale image of the search area is recognized (step S 42).

In addition, it is determined whether or not the change in brightness in the gray scale image of the designated area is large (step S 43), and in the case that the change in brightness is large (YES in step S 43), the flag is set for the corresponding search area (step S 44).

When a flag is set for a search area having a large change in brightness, i is increased by 1 (i=i+1) in order to carry out a search of the next column, and thereby the next column to be searched presently is designated.

In addition, in the case that the change in brightness of the gray scale image in the designated search area is not large (NO in step S 43), the processing returns to step S 45 without taking any action.

Moreover, as shown in FIGS. 16A and 16B, because the total number in each row of the first detected area 51 and the search area is M areas, the value of the register i is determined (step S 46), and the brightness change search processing returns to step S 42 until the value of i is larger than M, and the processing described above repeats (NO in step S 46).

Therefore, in step S 24 in the flowchart shown in FIG. 14, in the case that the number of areas in the reference image zone 50 is greater than 1 (YES in step S 24), brightness change search processing is executed on the search area in each of the rows (where the row j=0, search areas 54 and 55) that protrude from the reference image zone 50.

In addition, in step S 46, when the value of i becomes large (i>M) (YES in step S 46), the brightness change search processing ends.

Next, an example of a different implementation of the highlighted image output processing in the partition method of the area and the search method will be explained with reference to the drawings in FIGS. 19A, 19B and 20.

Second Embodiment

Figure 19A:
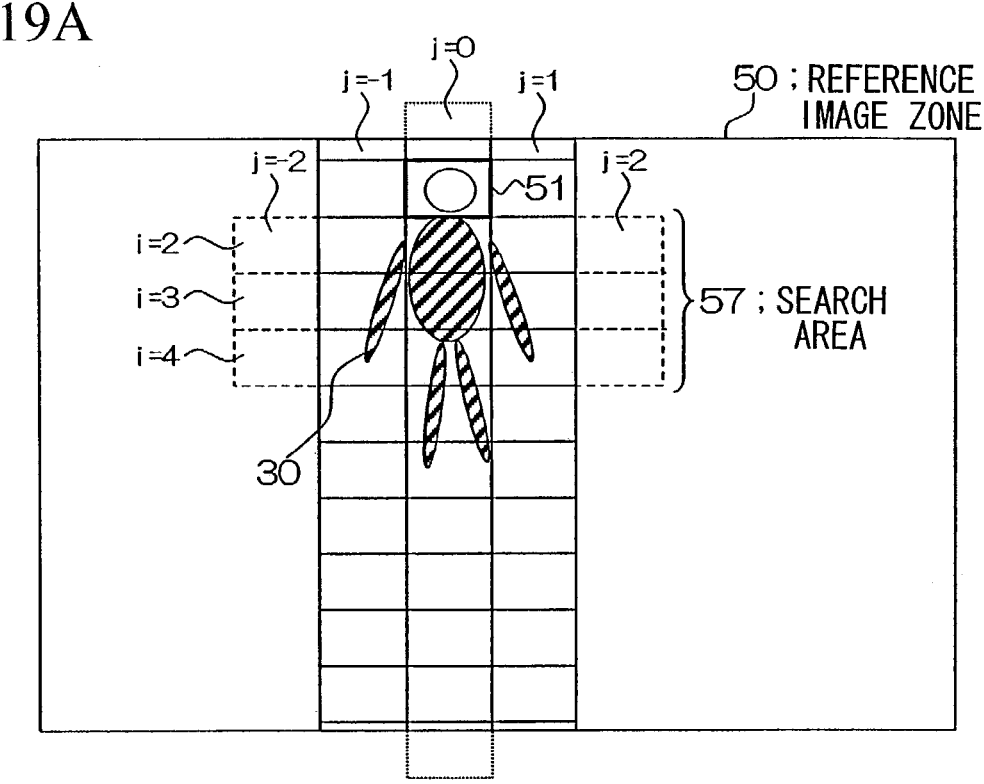
FIGS. 19A and 19B are drawing showings the zone search sequence in an image according to a second and third embodiment of the example.

FIG. 19A is a drawing for explaining the second embodiment of the highlighted image output processing. In the case that the first embodiment enlarges the search area in the row direction, enlargement is carried out in the row direction by making all search areas included vertically in M areas serve as objects. In contrast, in the second embodiment, for the rows outside of the right and left j=±1, a search is carried out by enlarging only the area of a row where a search area having a set flag is present. In FIG. 19A, where j=1 and j=−1, brightness change search processing is carried out in the rows j=2 and j=−2 only in search area 57 at i=2, 3, 4, where a change in brightness has been recognized.

Specifically, in the case that the search areas are represented as A(i, j), the presence of a change in brightness is denoted 0 and the absence of a change in brightness is denoted X, the brightness change processing is carried out as follows:

A(1, −1): X, A(1, 0): X, A(1, 1): X→no area enlargement
A(2, −1): X, A(2, 0): 0, A(2, 1): X→no area enlargement
A(3, −1): 0, A(3, 0): 0, A(3, 1): 0→area enlargement present A(4, −1): 0, A(4, 0): 0, A(4, 1): 0→area enlargement present
A(5, −1): 0, A(5, 0): 0, A(5, 1): 0→area enlargement present
A(6, −1): X, A(6, 0): X, A(6, 1): X→no area enlargement
A(M, −1): X, A(M, 0):X, A(M, 1): X→no area enlargement Thereby, in the previous row, in a column in which there is no recognition of the change in brightness, the possibility that a change in brightness will be recognized on the other side is also small, and thus by omitting the unnecessary brightness change search processing, the processing load on the image processing unit is decreased.

Third Embodiment

Figure 19B:
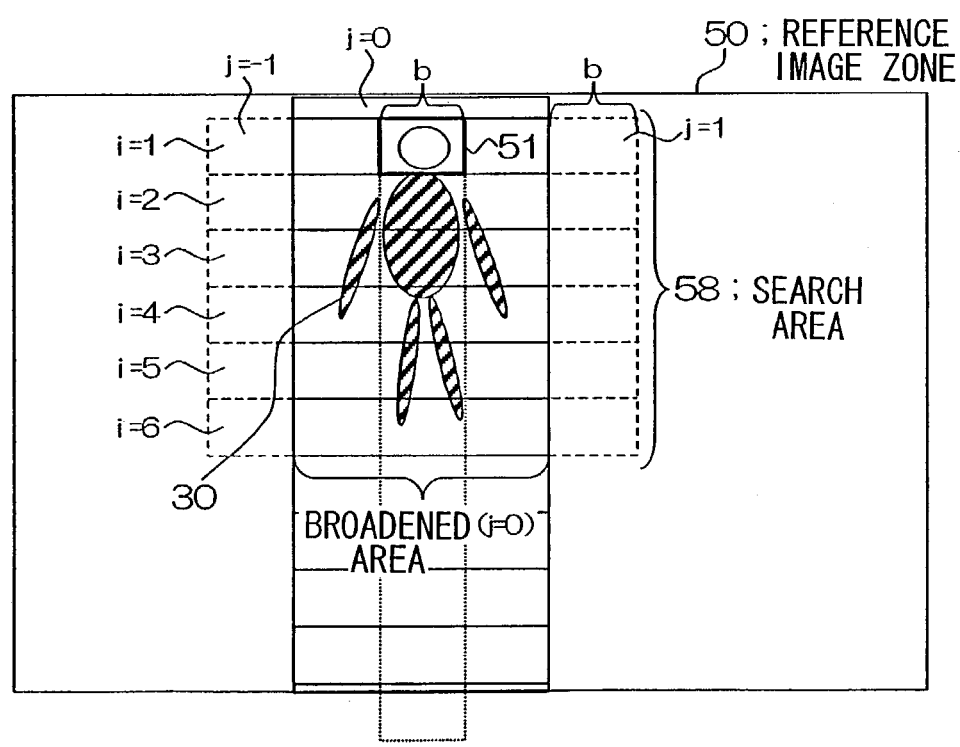

FIG. 19B is a drawing for explaining the third embodiment of the highlighted image output processing. In the third embodiment, the area made by extending the search area in the horizontal direction is set using the size of the first detected area 51 as the reference, and in the case that the search area is expanded in the row direction, in the row that is the same as the first detected area 51, the column in which a change in brightness has been recognized is the object. In FIG. 19B, the area made by extending in the horizontal direction using the size of the first detected area 51 as the reference is represented as j=0, and in the row j=1 or j=−1, the search area 58 from i=1 to i=6, where a change in brightness has been recognized in the area where j=0, becomes the object of the brightness change search processing.

Thereby, processing that determines the column of the object of the brightness change search processing depending on the presence or absence of a brightness change when carrying out expansion in the row direction becomes unnecessary, and thus the processing load on the image processing unit 1 can be further decreased.

Fourth Embodiment

Figure 20:
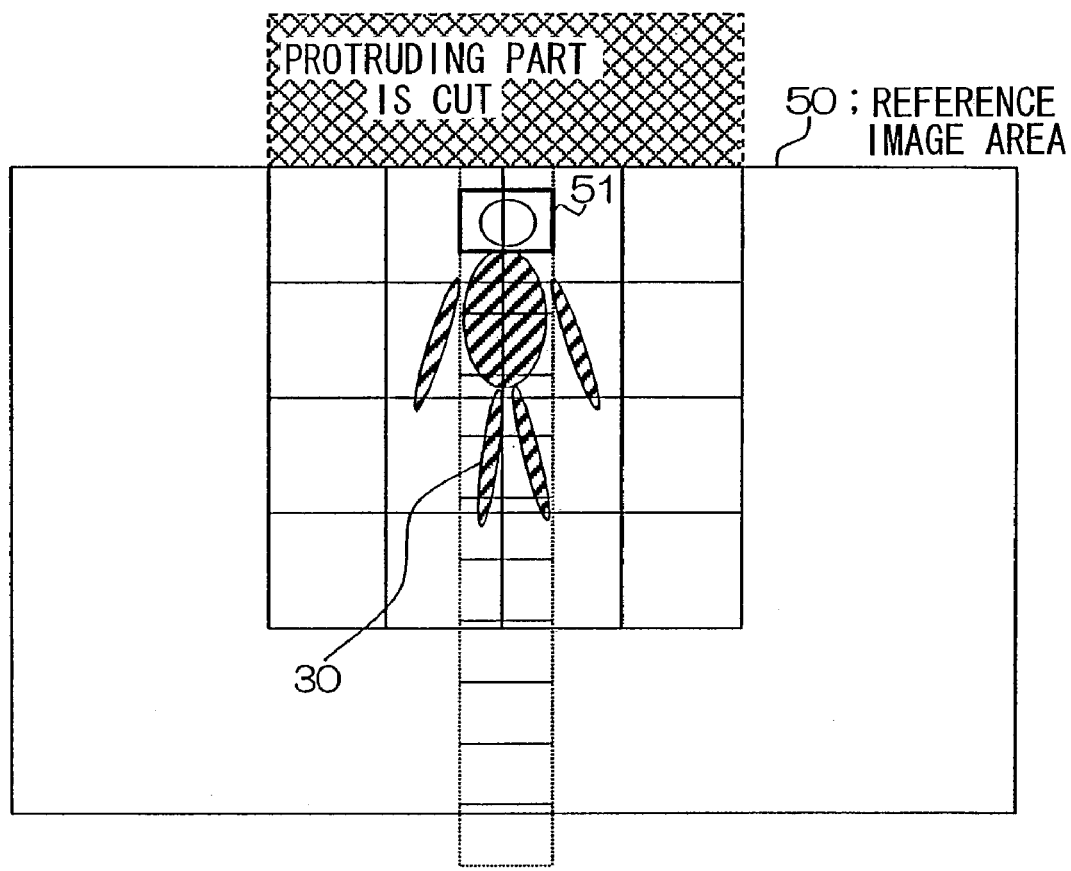
FIG. 20 is a drawing showing the zone search sequence in an image according to a fourth embodiment of the example.

FIG. 20 is a drawing for explaining the fourth embodiment of the highlighted image output processing. In the fourth embodiment, irrespective of the size of the first detected area 51, the reference image zone 50 is partitioned by a search area having a predetermined size, and the brightness change search processing is carried out.

In FIG. 20, the brightness change search processing is executed using an area somewhat larger than the first detected area 51.

However, thereby, the brightness change search processing is carried out in the reference image zone 50 irrespective of the size of the first detected area 51, and thus although the processing load on the image processing unit 1 can be largely reduced, in the case that the difference in the size of the search area and the size of the object 30 is great, it is necessary to consider the case that this may entail a decrease in the detection precision and a decrease in the detection speed.

Moreover, when added to the first through fourth embodiments described above, in the case that the search area is expanded, the parallax calculation between the images of the two infrared cameras 2R and 2L can be carried out first, and then only the portion of the search area having identical parallax needs to be expanded.

In addition, because there are portions in which there is no change in brightness equal to or greater than a predetermined value even for the same physical object, vertical expansion that included this portion is also possible.

In addition, by clearing the flags of the areas having a parallax differing from the first detected area 51, even in the case that the objects are overlapping, the objects can be distinguished and extracted. For example, when something hidden is detected in the case that an object is present behind the vehicle, for example, there is a change in brightness in the search area, and at the same time, the search area has a parallax value that differs from the first detected area 51, and a plurality of search area having such parallax values are present. Thus, in the case that the distance of the area is found using the parallax values and it is thought that a person is present behind the body of the vehicle, the portion excluding the hidden area can be given a highlighted display.

Next, an example of the partition of the search area will be explained with reference to the drawings of the other examples of partitions.

Figure 21A:
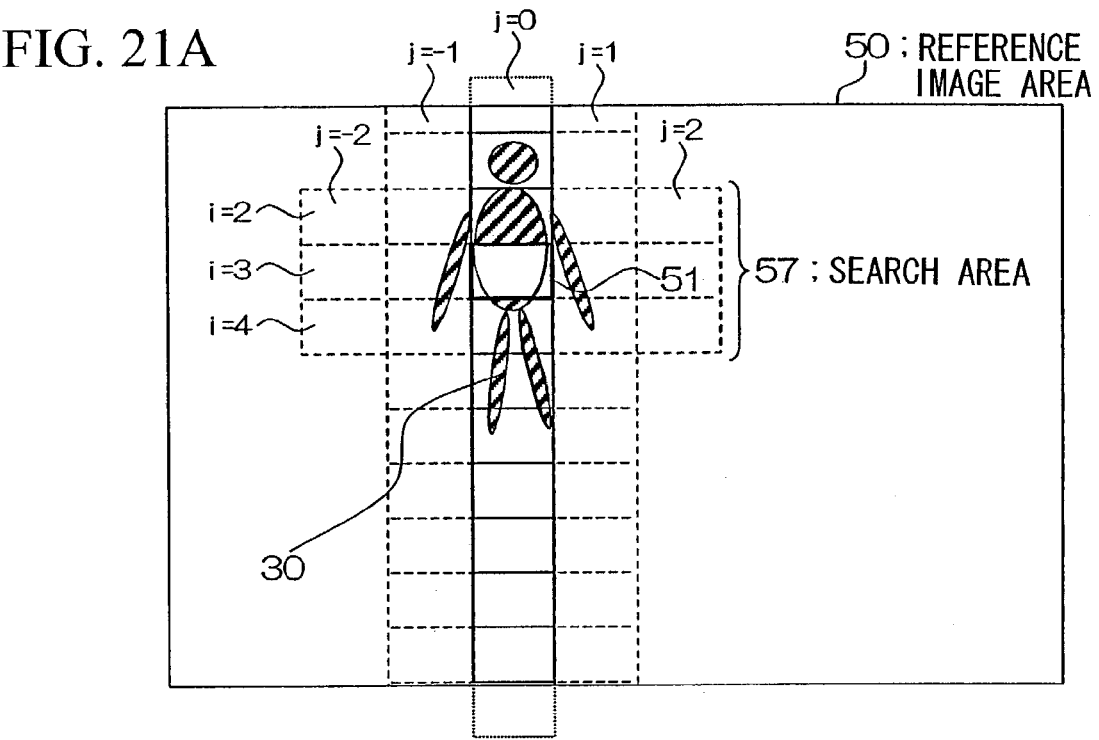
FIGS. 21A and 21B are drawings showing an example of the zone division results in an image of the same example.

Like the head portion of the object 30 explained in the first through fourth embodiments described above, FIG. 21A is an example of the partition of the reference image using medium sized search areas that have been set based on the first detected area 51, which has detected the torso of the object 30.

Figure 21B:
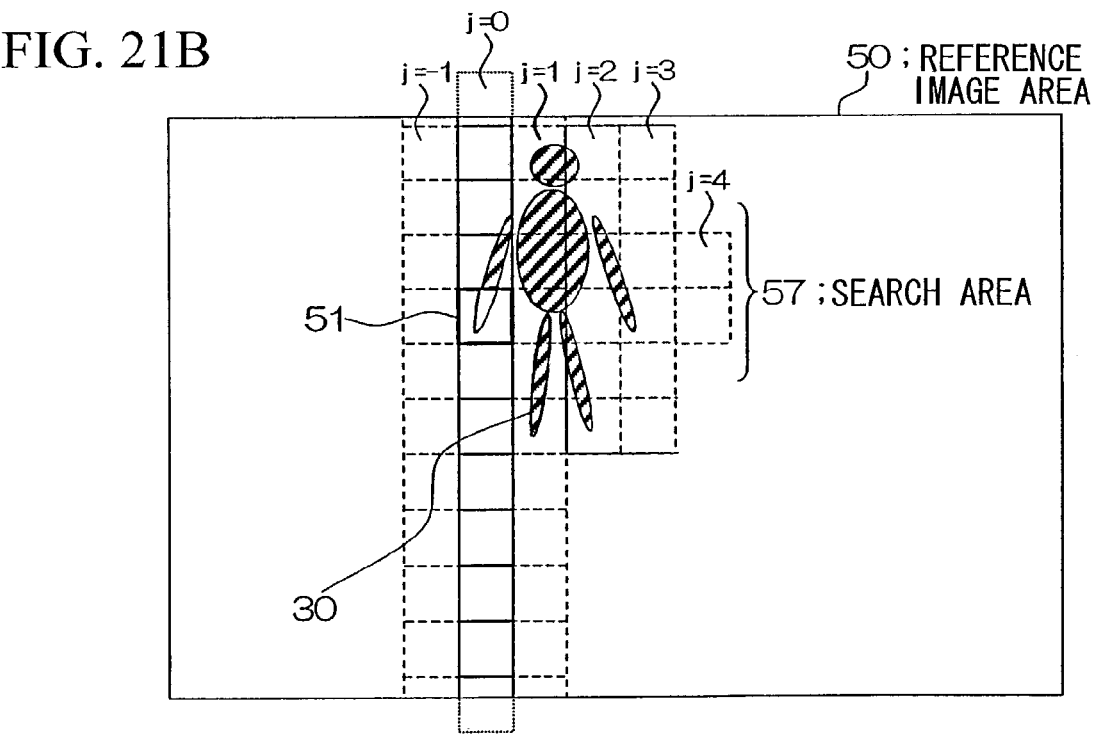

FIG. 21B is an example of the partition of a reference image using small sized search areas that have been set based on the first search area 51, which has detected the end of the hand of the object 30.

Figure 22:
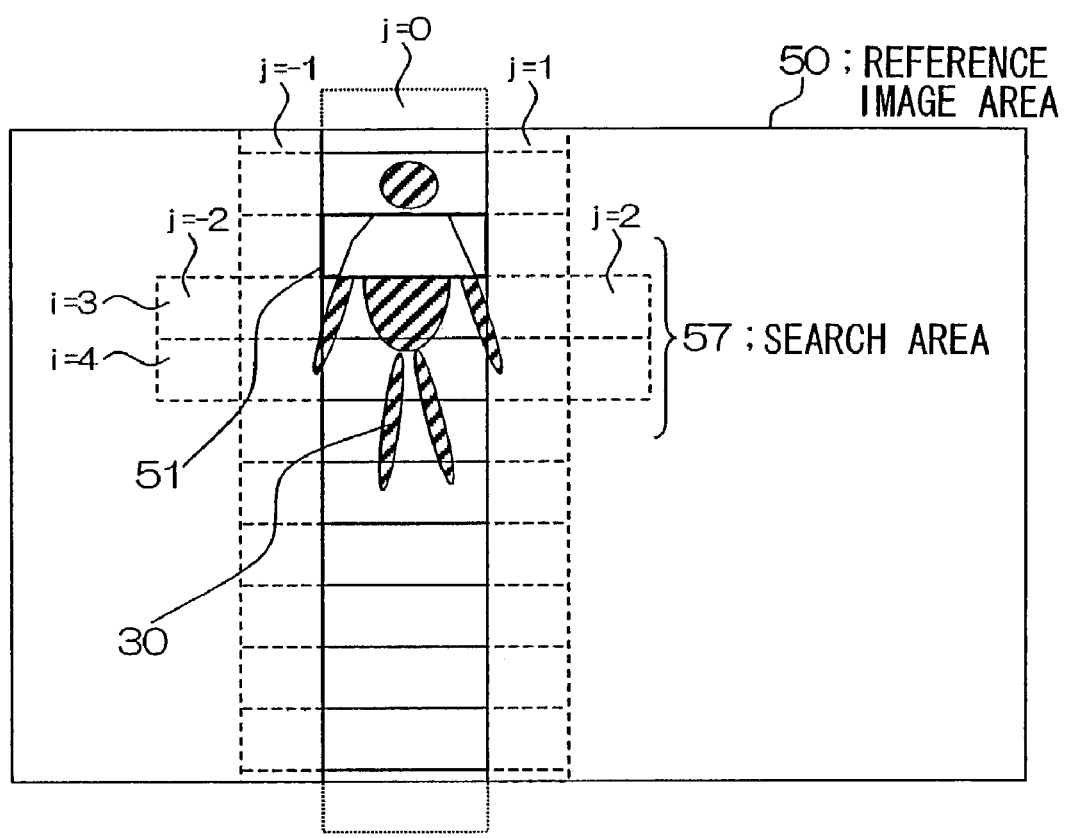
FIG. 22 is a drawing showing an example of the zone division results in an image of the same example.

FIG. 22 is an example of the partition of the reference image using a transversely large sized search area set based on the first detected area 51, which has detected both shoulders and the chest portion of the object 30. As shown in FIG. 22, in the case that the size of the first detected are 51 in the transverse direction is large, the transverse size of the search area can be adjusted by the distance to the object found from the parallax of the image.

Moreover, in the embodiments described above, examples of monitoring the front of the vehicle were given, but monitoring can be carried out in any direction, such as the back of the vehicle.

In addition, in the embodiments described above, infrared camera 2R and 2L were provided, and the distance to the object found using parallax is also used as determination material for extracting identical physical objects. However, it is possible to provide one camera, and in this case, the distance to the object can be eliminated from the determination material used for extracting an identical physical object.

In addition, in the present embodiment, the image processing unit 1 includes the extracted zone setting device, the search zone setting device, the physical object recognition device, and the parallax calculating device. More concretely, steps S 1 to S 18 in FIG. 3 correspond to the extracted zone setting device, steps S 21 to S 24 in FIG. 14 correspond to the search zone setting device, and steps S 25 to S 37 in FIG. 14 correspond to the physical body recognizing device. Furthermore, step S 34 in FIG. 14 corresponds to the parallax calculating device.

As explained above, the vehicle information providing apparatus of the present embodiments sets the search area in the vicinity of the vehicle using a first detected area 51, which is the first area to be detected, as the reference, and in the case that a change in brightness is recognized in the search area and two infrared cameras are used, the search area having a parallax identical to the first search area 51 is determined to be the image of a physical object identical to that in the first search area 51, Thereby, it is possible to extract an image area that takes in the entire object reliably.

Therefore, in order to carry out conventional processing that extracts the head, which is assumed to have the highest surface temperature among the body members of a person, mistaken detection due to changes in the temperature of the body members of the detected object have been a problem. Examples of such parts are parts whose temperature had risen due to exposure to direct sunlight and the parts whose temperature had fallen due to being blown on by the wind. Thereby, even when the parts of the body or the like are first detected, there is the effect that the entire object (the entire body of the detected object) can always be taken.

As explained above, according to a first aspect of the vehicle information providing apparatus, a search zone is set using the extracted zone set by the extraction zone setting device as a reference, and by searching the zone that has a change in brightness in the vicinity of the extracted zone, a zone in which is it appears that a physical body can be recorded that is identical to the physical body recorded in the extracted zone can be given a highlighted display along with the extracted zone. Therefore, when the search zone is set based on the size of the extracted zone, the size of the search zone can be suitably set with respect to the object by using the size of the extraction zone that is proportional to the size of the object. Thereby, the effect is obtained that the detection speed of detecting the entire physical object by searching in the image zone using the search zone is increased.

According to a second aspect of the present invention, a zone having a change in brightness and a parallax identical to the extracted zone is recognized as a zone in which it is assumed that the physical object can be taken that is identical to the physical object taken in the extracted zone, and this can be given a highlighted display along with the extracted zone.

Therefore, even in the condition that a plurality of physical objects are overlapping, there is the effect that a plurality of objects can be separated and displayed by selecting a zone having the same parallax (distance to the object) as the image of the two cameras.

According to a third aspect of the vehicle information providing apparatus, in the case that the zone of the image is exceeded when the search zone setting device sets the search zone vertically with respect to the extraction zone, the physical object recognition device determines that a large part of the physical object has been recorded in the extracted zone, and carries out highlighted display of only the extracted zone without carrying out a search of the physical object.

Therefore, there is the effect that unnecessary processing can be avoided by stopping the search for physical bodies after it has been determined that a large part of the physical body has been taken in the extracted zone.

Although there have been described what are the present embodiments of the invention, it will be understood by persons skilled in the art that variations and modifications may be made thereto without departing from the spirit or essence of the invention.

What is claimed is:

1. A vehicle information providing apparatus that displays an image recorded by at least one infrared camera, the apparatus comprising:
   an extracted zone setting device that sets a present zone of a physical object image, which corresponds to a physical object detected by multivalued processing of said image, as an extracted zone;
   a search zone setting device that sets a search zone for detecting changes in brightness in the vicinity of said extracted zone; and
   a physical object recognition device that searches for changes in brightness in said search zone, and provides a highlighted display of a portion of the search zone in which there is a change in brightness, along with said extracted zones, as the physical object image.

2. A vehicle information providing apparatus according to claim 1, comprising:
   two infrared cameras; and
   a parallax calculating device that finds the parallax of the images recorded by said two cameras; and wherein
   said physical object recognition device provides a highlighted display of the portion of the search zone in which there is a change in brightness and which has a parallax identical to said physical object image.

3. A vehicle information providing apparatus according to claim 1, wherein, in the case that the search zone is set adjacent to an upper edge or a lower edge of the extracted zone and exceeds a range of said image, said physical object recognition device stops searching for changes in brightness.

4. A vehicle information providing apparatus according to claim 1,
   further including a warning device which provides a warning to a driver of the vehicle when there is a high danger of collision by the vehicle with an object recognized by the physical object recognition device.

5. A vehicle information providing apparatus according to claim 1,
   wherein said search zone includes a plurality of search areas, and said physical object recognition device selectively searches for changes in brightness in said search areas.

6. A vehicle information providing apparatus according to claim 5,
   wherein said search areas separated from each other in at least one of columns and rows, and said physical object recognition device searches for changes in brightness in various ones of said search areas by said at least one of columns and rows based on detected changes in brightness in others of said search areas.

7. A vehicle information providing apparatus according to claim 1,
   wherein said search zone includes a plurality of search areas, and said physical object recognition device searches for changes in brightness only in various ones of said search areas depending on brightness changes detected in others of said search areas.

8. A vehicle information providing apparatus according to claim 1,
   wherein a size of said search zone is set proportional to a size of said extracted zone.

9. A vehicle information providing apparatus according to claim 1, wherein
   the highlighted display comprising a frame which surrounds both said portion of the search zone in which there is a change in brightness, and said physical object image.

* * * * *